United States Patent
Ishiguro et al.

(10) Patent No.: US 9,499,119 B2
(45) Date of Patent: Nov. 22, 2016

(54) AIRBAG APPARATUS FOR A DRIVER'S SEAT

(71) Applicant: TOYODA GOSEI CO., LTD., Kiyosu-shi, Aichi-ken (JP)

(72) Inventors: Naohiko Ishiguro, Kiyosu (JP); Mikine Hayashi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/622,984

(22) Filed: Feb. 16, 2015

(65) Prior Publication Data
US 2015/0239422 A1  Aug. 27, 2015

(30) Foreign Application Priority Data
Feb. 27, 2014  (JP) ................... 2014-037159

(51) Int. Cl.
| | |
|---|---|
| *B60R 21/239* | (2006.01) |
| *B60R 21/203* | (2006.01) |
| *B60R 21/2338* | (2011.01) |
| *B60R 21/237* | (2006.01) |

(52) U.S. Cl.
CPC .......... *B60R 21/239* (2013.01); *B60R 21/203* (2013.01); *B60R 21/237* (2013.01); *B60R 21/2338* (2013.01); *B60R 2021/2395* (2013.01); *B60R 2021/23382* (2013.01); *B60R 2021/23384* (2013.01)

(58) Field of Classification Search
CPC .............. B60R 21/239; B60R 21/203; B60R 21/2338; B60R 2021/23382; B60R 2021/2395; B60R 2021/23384
USPC ...................... 280/739, 743.2, 731
See application file for complete search history.

(56) References Cited

U.S. PATENT DOCUMENTS

2012/0068444 A1* 3/2012 Suzuki ................. B60R 21/239
                                                          280/739
2014/0062071 A1  3/2014 Ishiguro et al.

FOREIGN PATENT DOCUMENTS

JP  2012-61982 A  3/2012

* cited by examiner

*Primary Examiner* — Keith Frisby
(74) *Attorney, Agent, or Firm* — Posz Law Group, PLC

(57) ABSTRACT

In a driver seat airbag apparatus, an airbag includes a belt member and a vent mechanism. The belt member includes two connecting sections extending from opposite sides of a cover portion for covering a vent hole. The vent mechanism includes an outer panel that has a vent hole and is located outside of the cover portion, an inner panel that has an inner opening and is located on an inner side of the cover portion, and a guide. The connecting sections run through the guide and move toward the vent hole for letting the cover portion open the vent hole. The guide holds the connecting sections such that the connecting sections serve as the tethers. A joint of the tethers to the driver side wall is located toward a center of the driver side wall relative to the vent hole as viewed from a side of the driver side wall.

5 Claims, 22 Drawing Sheets straight-ahead steering state

180° turned state

AIRBAG APPARATUS FOR A DRIVER'S SEAT

CROSS REFERENCE TO RELATED APPLICATIONS

The Present application claims priority from Japanese Patent Application No. 2014-037159 of Ishiguro et al., filed on Feb. 27, 2014, the disclosure of which is hereby incorporated into the present application by reference.

BACKGROUND OF THE INVENTION

1. Field of the Invention

The present invention relates to an airbag apparatus for a driver's seat mountable on a steering wheel of a vehicle. More particularly, the invention relates to an airbag apparatus for a driver' seat in which a vent hole of an airbag is covered by a cover portion, which cover portion is continuous with a tether that controls a clearance between a vehicle body side wall and a driver side wall of the airbag at inflation, and the vent hole is opened when the cover portion loosens along with loosening of the tether when the airbag cushions the driver.

2. Description of Related Art

JP 2012-061982 A discloses a known airbag apparatus for a driver's seat with a vent mechanism for preventing undue elevation of airbag pressure, in which a vent hole of an airbag is opened with the aid of loosening of a tether. In the airbag apparatus, the airbag is so inflatable as to separate a vehicle body side wall deployable toward a steering wheel and a driver side wall deployable toward the driver, and includes a tether that connects the vehicle body side wall and the driver side wall for controlling a clearance between the vehicle body side wall and the driver side wall at airbag inflation. The vent hole is formed on the vehicle body side wall and is covered by a cover portion which is formed continuously with the tether. In operation of the vent mechanism, the cover portion loosens and opens the vent hole when the driver side wall cushions the driver and moves toward the vehicle body side wall.

More specifically, the above-described vent mechanism further includes an inner panel that is located on an inner surface of the vehicle body side wall at the location of the vent hole. The cover portion, which is continuous with the tether, is located between the vent hole and the inner panel. The first end of the tether on the side of the cover portion is joined to the vehicle body side wall whereas the second end of the tether away from the cover portion is joined to the driver side wall. The inner panel covers an inner surface of the cover portion and is joined to the vehicle body side wall by its opposite edges in a width direction of the cover portion. The inner panel includes at the center an inner opening so as to allow an internal pressure of the airbag to act on the cover portion.

With this vent mechanism, when the driver side wall cushions the driver at airbag inflation and moves toward the vehicle body side wall, the tether loosens, and the cover portion receives an internal pressure of the airbag through the inner opening of the inner panel and loosens outwardly in such a manner as to pass through the vent hole, and then slips out of a space between the inner opening and the vent hole, thereby opening the vent hole. Thus an inflation gas is released from the vent hole.

However, in the conventional airbag apparatus, when the cover portion loosens and opens the vent hole, a length of a portion of the cover portion passing through the vent hole equals to a loosening amount of only one tether which extends from a peripheral region of the cover portion not joined to the vehicle body side wall.

In other words, the height of the cover portion which has slipped out of the vent hole is only half of a distance that the driver side wall moves toward the vehicle body side wall. This is not enough to open the vent hole sufficiently and release an inflation gas quickly.

SUMMARY OF THE INVENTION

An object of the present invention is to provide an airbag apparatus for a driver's seat that is capable of exhausting an inflation gas quickly despite of the configuration that a vent hole is opened with the aid of loosening of a tether.

The airbag apparatus for a driver's seat of the invention is adapted to be housed in a boss section located in a vicinity of a generally center of a ring section of a steering wheel for holding by a driver. The airbag apparatus includes an airbag that is adapted to be housed in the boss section in a folded-up configuration. The airbag is so inflatable as to separate a driver side wall which is deployable toward the driver and a vehicle body side wall which is deployable toward the ring section and includes at a generally center an inlet opening for introducing an inflation gas. The airbag further includes a vent hole that is formed in a circumference of the inlet opening on the vehicle body side wall for exhausting an inflation gas, and a vent mechanism for opening the vent hole.

The vent mechanism includes:
- a belt member including:
  - a cover portion that covers the vent hole in an openable fashion; and
  - two connecting sections that extend from opposite sides of the cover portion in a continuous fashion and are connected to the driver side wall by a joint, thus the connecting section functioning as first tethers that connect the vehicle body side wall and the driver side wall for controlling a clearance between a vicinity of the vent hole on the vehicle body side wall and the joint to the driver side wall at airbag inflation;
- an outer panel that is located on an outer side of the cover portion and provided with the vent hole;
- an inner panel that is located on an inner side of the cover portion and provided with an inner opening which allows an internal pressure of the airbag to act on the cover portion therethrough; and
- a guide section which the two connecting sections run through in a movable fashion toward the vent hole in order to allow the cover portion to loosen and open the vent hole for releasing an inflation gas when the driver side wall cushions the driver and moves toward the vehicle body side wall, the guide section holding the two connecting sections such that the connecting sections function as the tether at airbag inflation.

Moreover, the joint of the connecting section, i.e., of the first tethers, is located toward a central region of the driver side wall relative to the vent hole as viewed from a side of the driver side wall at full inflation of the airbag.

At actuation of the airbag apparatus for a driver's seat of the invention, when the driver side wall cushions the driver at airbag inflation and moves toward the vehicle body side wall, the connecting sections serving as the first tethers loosen. In the meantime, the cover portion receives an internal pressure of the airbag through the inner opening of the inner panel and loosens outwardly in such a manner as to pass through the vent hole, and then slips out of a space between the inner opening and vent hole, thereby opening the vent hole. Thus an inflation gas is released from the vent hole.

At this time, both of the two connecting sections, which extend from opposite sides of the cover portion with the aid of the guide section and are connected to the driver side wall, deploy toward the vent hole, such that the cover portion passes through the vent hole. That is, each of the two connecting sections moves toward the vent hole and runs through the guide section for a distance that the driver side wall comes close to the vehicle body side wall, and accordingly a height that the cover portion protrudes out of the vent hole is generally equal to the distance that the driver side wall comes close to the vehicle body side wall, which height is generally two times of that of a conventional airbag. As a result, the vent hole will open more widely than a conventional airbag and release an inflation gas quickly, such that the airbag will cushion and protect the driver with an adequately suppressed internal pressure.

The joint to the driver side wall of the tethers, which are provided with the connecting sections, respectively, is located toward the center of the driver side wall relative to the vent hole as viewed from the side of the driver side wall at full inflation of the airbag. When the driver moves toward a lower end of the ring section of the steering wheel which supports the vehicle body side wall of the airbag as is fully inflated while steering the ring section with a column angle, and pushes the airbag forward, the steering wheel may be steered straight ahead or may be turned by 180°. With the above configuration, the amounts of forward movement of a vicinity of the center of the driver side wall will be generally uniform regardless whether the steering wheel is steered straight ahead or turned by 180° because the rotation center of the steering wheel and the center of the driver side wall are generally coincident. As a result, however much be a steering angle at actuation of the airbag apparatus, a loosening amount of the tethers at cushioning the driver will be generally steady and the vent hole will open corresponding to the amount of forward movement of the driver, thereby attaining a steady opening performance of the vent hole.

Therefore, the airbag apparatus for a driver's seat of the invention will be capable of releasing an inflation gas quickly despite of the configuration that the vent hole is opened with the aid of loosening of the tethers, and attain a steady opening performance of the vent hole however much be a steering angle at actuation.

In the above-described airbag apparatus for a driver's seat of the invention, it is desired that the two connecting sections are arranged symmetrically about a straight line that connects the inlet opening and the vent hole as viewed from the side of the driver side wall at full inflation of the airbag.

With this configuration, the two connecting sections are arranged in a concentric fashion about the inlet opening, and equally distant from the inlet opening. Therefore, when the driver side wall cushions the driver and moves toward the vehicle body side wall, the loosening amounts of the connecting sections and the amounts that the connecting sections deploy when the cover portion passes through the vent hole will be equal in a steady fashion. As a result, the opening fashion of the vent hole will be steady in every airbag.

It is further desired that the airbag further includes two second tethers that are connected to the vehicle body side wall and driver side wall in a symmetric fashion to the first tethers about the inlet opening as viewed from the side of the driver side wall at full inflation of the airbag.

With this configuration, a clearance between the driver side wall and vehicle body side wall of the airbag are controlled in a balanced fashion at airbag inflation by the two first tethers and two second tethers. If the airbag requires any other tethers in addition to the first tethers having the connecting sections for controlling a clearance between the driver side wall and vehicle body side wall, this configuration with the four tethers will help inflate the airbag in a balanced fashion with limited number of tethers.

It is also desired that the vent hole is so designed as to be located in front of the inlet opening and at a space between the boss section and the ring section of the steering wheel at airbag deployment, and that the connecting sections are located at left and right sides of the cover portion and an outer edge deployable at a front side in a width direction and in a front and rear direction of the cover portion is connected neither to the outer panel nor to the inner panel, whereas an inner edge located at a rear side in a width direction of the cover portion is connected at least to the inner panel.

With this configuration, a fixed peripheral side of the cover portion, i.e., the outer edge or front edge that faces away from the inlet opening, will pass through the vent hole for letting out an inflation gas. When the vent hole is opened, the cover portion will be formed into a curve shaped like a tapering half pipe, and the tapering half pipe will be located at a space between front spokes inside the ring section, i.e., inside so-called "1R". Therefore, the vent hole will exhaust an inflation gas smoothly toward a large space in the front.

Moreover, since the belt member is connected to the inner panel, the connecting sections will be prevented from slipping through the guide section freely while the airbag is folded up, which slipping would change substantial lengths of the connecting sections. Therefore, this configuration will help stabilize the lengths of the connecting sections projecting out of the guide section and facilitate the folding work of the airbag by fixing the location and posture of the belt member.

The above-described airbag apparatus for a driver's seat may be configured such that:
- the inner panel of the vent mechanism is composed of a part of the vehicle body side wall;
- an outer peripheral edge of the outer panel is connected to an outer peripheral edge of the inner panel which is a part of the vehicle body side wall;
- the guide section is composed of a tubular region that includes on both sides of the inner opening each one insert opening and is formed of the inner panel and outer panel between the two insert openings; and
- the cover portion of the belt member is located between the outer panel and the inner panel, and the two connecting sections run through the two insert openings, respectively, and protrude out of opposite ends of the tubular region.

This configuration will serve to reduce the number of components of the vent mechanism, because the inner panel of the vent mechanism is composed of a part of the vehicle body side wall, which forms a circumferential wall of the airbag, and the tubular region serving as the guide section is also formed by the two insert openings formed on the vehicle body side wall.

Furthermore, since the vent hole is formed on the outer panel that is prepared separate from the vehicle body side wall or driver side wall, the shape of the vent hole can be easily changed without changing the inner opening on the inner panel, i.e., on the vehicle body side wall. That is, a design change of the vent hole will be easily handled by changing the outer panel, which is a small component.

It will also be appreciated that:
the outer panel of the vent mechanism is composed of a part of the vehicle body side wall;
the inner panel of the vent mechanism is connected to an inner surface of the vehicle body side wall by opposite edges of the inner panel in a width direction of the cover portion;
the guide section is composed of a tubular region formed of the inner panel and the outer panel between joints of the opposite edges of the inner panel to the vehicle body side wall; and
the cover portion of the belt member is located between the outer panel and the inner panel such that the two connecting sections protrude out of opposite ends of the tubular region.

With this configuration, since the outer panel of the vent mechanism is composed of a part of the vehicle body side wall, which constitutes the circumferential wall of the airbag, and the tubular region serving as the guide section is formed only by connecting the opposite edges of the inner panel to the vehicle body side wall. Therefore, the vent mechanism will be formed in a simple fashion with limited number of components.

Furthermore, the inner opening of the inner panel may be composed of a plurality of through holes.

This configuration will help adjust the flow rate and speed of an inflation gas exhausted from the vent hole by changing number and/or opening area of the through holes of the inner opening, without changing the contour of the vent hole, thereby giving more flexibility to pressure control of the airbag at cushioning the driver.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
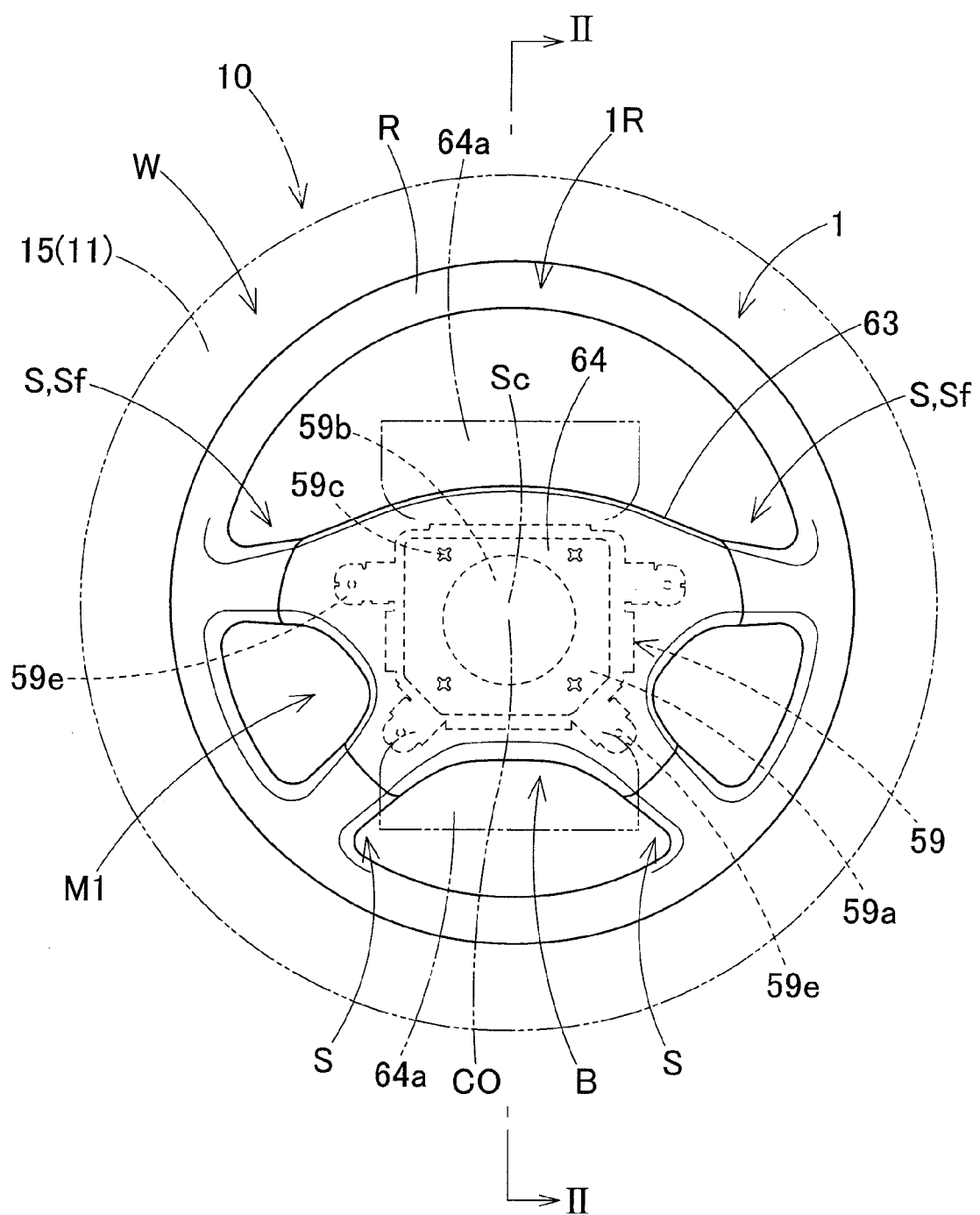
FIG. 1 is a plan view of an airbag apparatus for a driver's seat according to the first embodiment of the invention in service.
Figure 2:
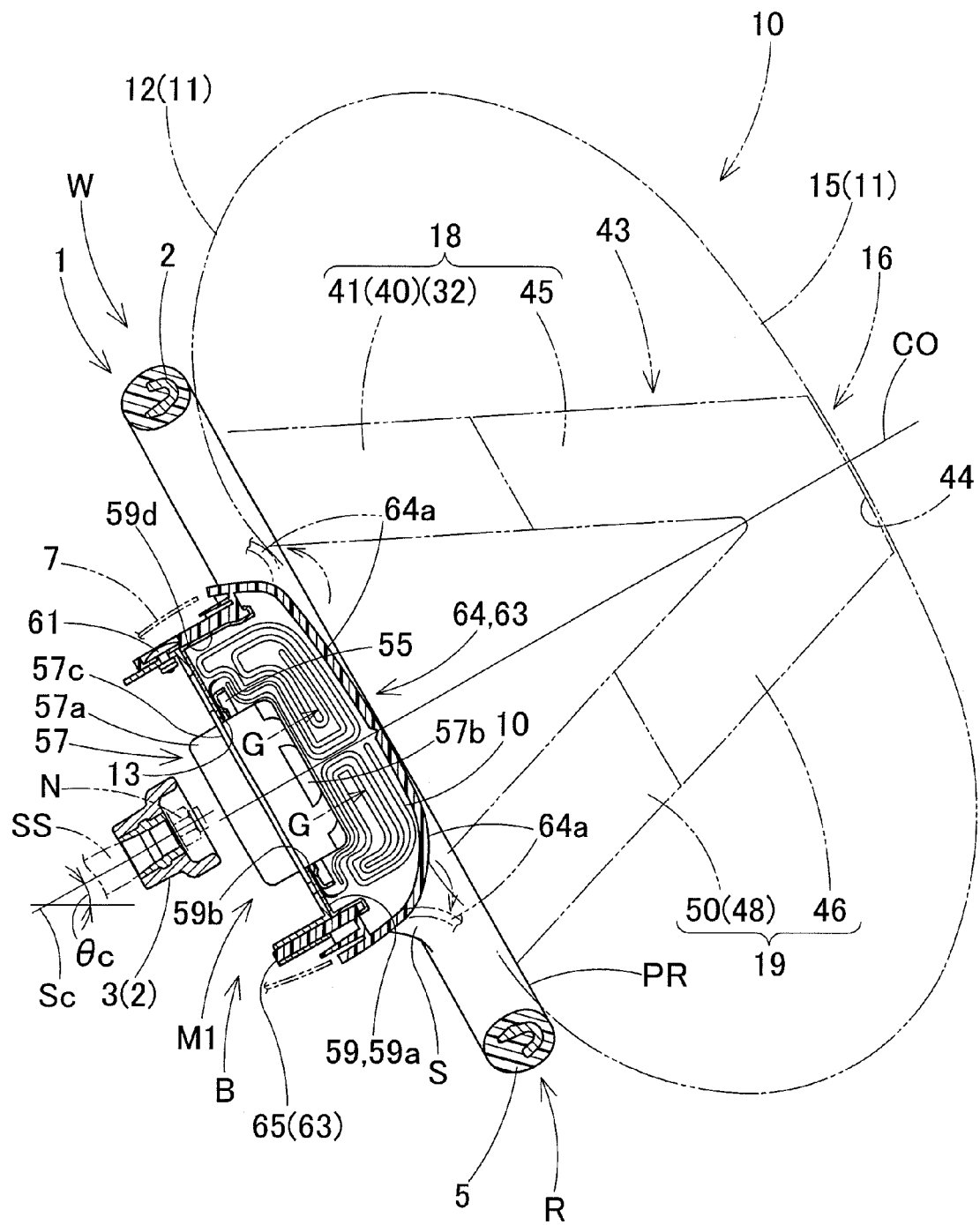
FIG. 2 is a schematic vertical section of the airbag apparatus of FIG. 1 taken along line II-II in FIG. 1.

As shown in FIGS. 1 and 2, an airbag apparatus M1 for a driver's seat according to a first embodiment of the invention is mounted on a steering wheel W. The steering wheel W includes a wheel body 1 and the airbag apparatus M1 disposed on top of a boss section B at the center of the wheel body 1. The wheel body 1 includes an annular ring section R, a boss section B and four spokes S. The ring section R is for holding at steering operation. The boss section B is disposed at the center of the ring section R and is secured to a steering shaft SS. The spokes S interconnect the boss section B and the ring section R.

In the description of the first embodiment, unless otherwise specified, an up and down direction corresponds to an up and down direction extending along an axial direction of the steering shaft SS. A front and rear direction corresponds to a front and rear direction extending orthogonally to the axial direction of the steering shaft SS of a vehicle being steered straight ahead, and a left and right direction corresponds to a left and right direction extending orthogonally to the axial direction of the steering shaft SS of a vehicle being steered straight ahead.

As shown in FIGS. 1 and 2, the steering wheel body 1 includes a core 2 of such metal as aluminum base alloy, and the core 2 has such a contour that the ring section R, boss section B and spokes S are interconnected. The core 2 is covered with a cladding layer 5 of synthetic resin at the ring section R and regions of the spokes S adjoining the ring section R. At an area of the core 2 corresponding to the boss section B is a steel boss 3 through which the steering shaft SS is inserted and then fixed by a nut N. Underneath the wheel body 1 is a lower cover 7 made from synthetic resin for covering the lower side of the boss section B.

In this embodiment, an inclination angle θc (hereinafter referred to as a "column angle" θc, FIG. 2) of the steering shaft SS is 22.5°.

As shown in FIG. 2, the airbag apparatus M1 includes an airbag 10, which is folded up, an inflator 57 which supplies the airbag 10 with an inflation gas, an airbag cover 63 which covers an upper side of the airbag 10, a case 59 which houses the airbag 10 and the inflator 57 and supports the airbag cover 63, and a retainer 55 which attaches the airbag 10 to the case 59 together with the inflator 57.

The retainer 55 has a square annular shape and holds down a peripheral area of a later-described inlet opening 13 of the airbag 10. The retainer 55 is provided at its four corners with unillustrated bolts, which are nut fastened against the case 59 for mounting the airbag 10 and the inflator 57 on the case 59.

The inflator 57 includes a body 57a and a flange 57c. The inflator body 57a is columnar in shape and is provided on the upper region with a plurality of gas discharge ports 57b. The flange 57c projects from an outer circumference of the body 57a and has unillustrated through holes for receiving the unillustrated bolts of the retainer 55.

As shown in FIGS. 1 and 2, the case 59 is made of sheet metal and formed into a generally rectangular parallelepiped shape. The case 59 includes a rectangular bottom wall 59a and a side wall 59d extending upward from an outer periphery of the bottom wall 59a. The case 59 is disposed above the boss section B of the steering wheel W, and serves as a housing of the airbag 10. The bottom wall 59a is provided with a circular insert hole 59b for receiving the body 57a of the inflator 57 from the lower side. Around the insert hole 59b are four through holes 59c for receiving the bolts of the retainer 55. At the upper end of the side wall 59d are mounting sections 59e extending outwardly. Unillustrated mounting bases of an unillustrated horn switch mechanism are attached to the mounting pieces 59e, and the case 59 is secured to the core 2 of the steering wheel W with the aid of the mounting bases. As a result, the airbag apparatus M1 is mounted on top of the boss section B of the steering wheel body 1 which is attached to the steering shaft SS. Moreover, a later-described side wall 65 of the airbag cover 63 is attached to the side wall 59d of the case 59 with rivets 61 or the like.

The airbag cover 63 is fabricated of synthetic resin and includes a ceiling wall 64 covering the airbag 10 from above, and a side wall 65 having a generally square tubular shape extending downward from a vicinity of an outer periphery of the ceiling wall 64. The ceiling wall 64 includes two doors 64a which are openable forward and rearward, respectively, when pushed by the airbag 10 as inflates.

The airbag 10 is made of a woven fabric of polyamide, polyester or the like, and is inflatable into such a shape as is round when viewed from above and generally oval when viewed from a side, as indicated by double-dotted lines in FIGS. 1 and 2. Referring to FIGS. 2 to 5 and 8, a circumferential wall 11 of the airbag 10 includes a vehicle body side wall 12, which is deployable toward the steering wheel body 1 (or toward the ring section R), and a driver side wall 15, which is deployable to face a driver D.

Figure 9:
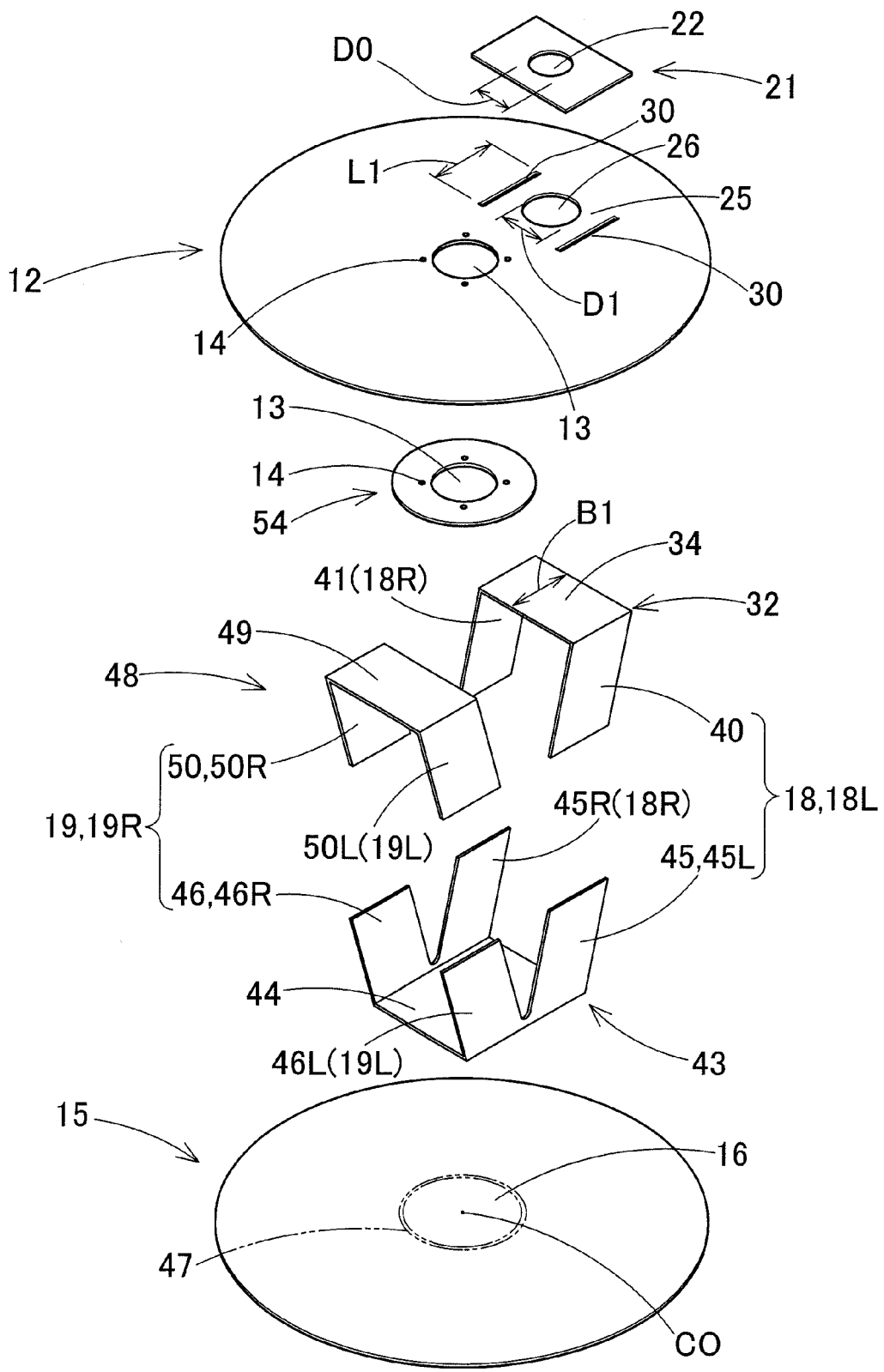
FIG. 9 schematically depicts components of the airbag of the first embodiment by perspective views.
Figure 10:
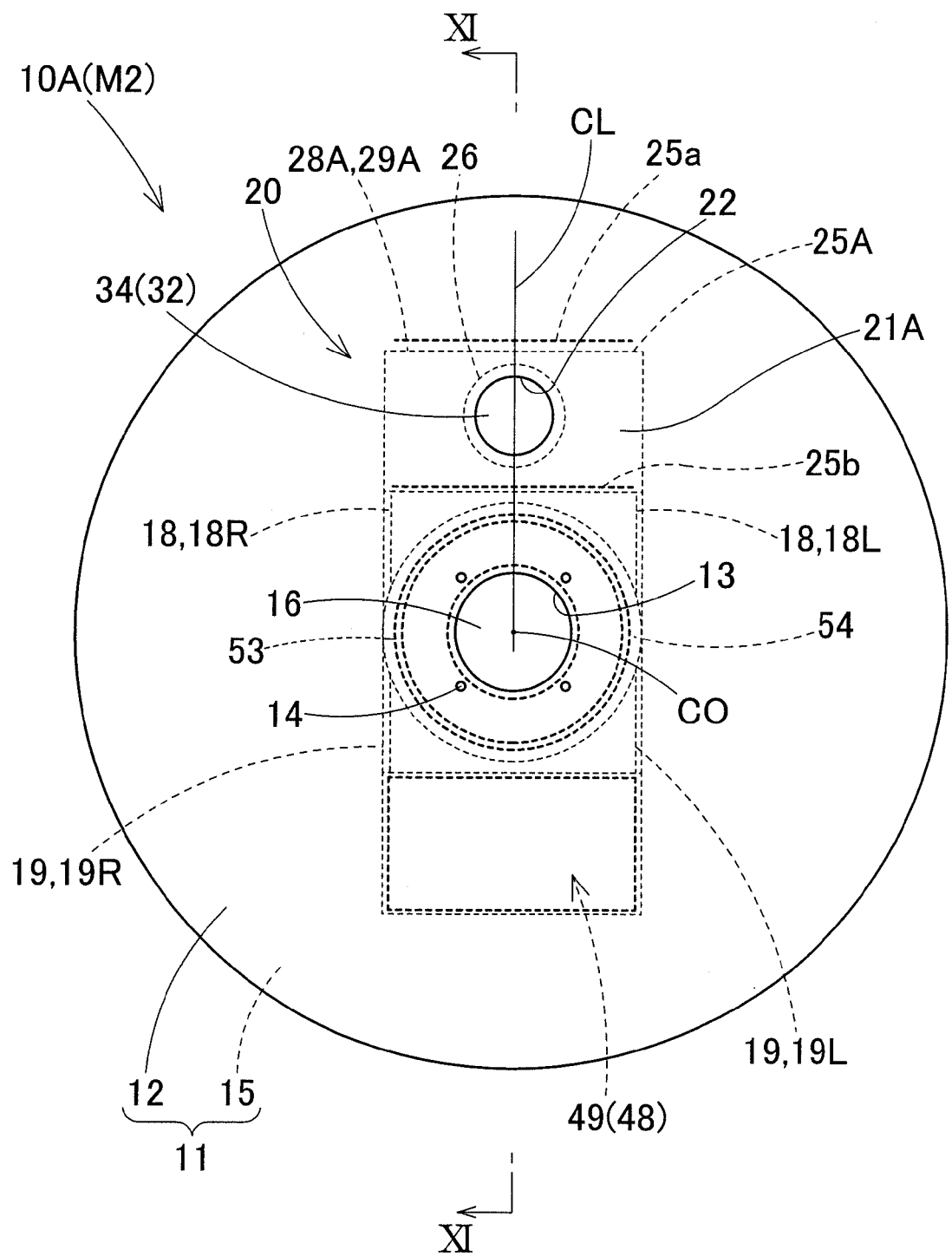
FIG. 10 is a bottom view of an airbag for use in an airbag apparatus of the second embodiment.
Figure 11:
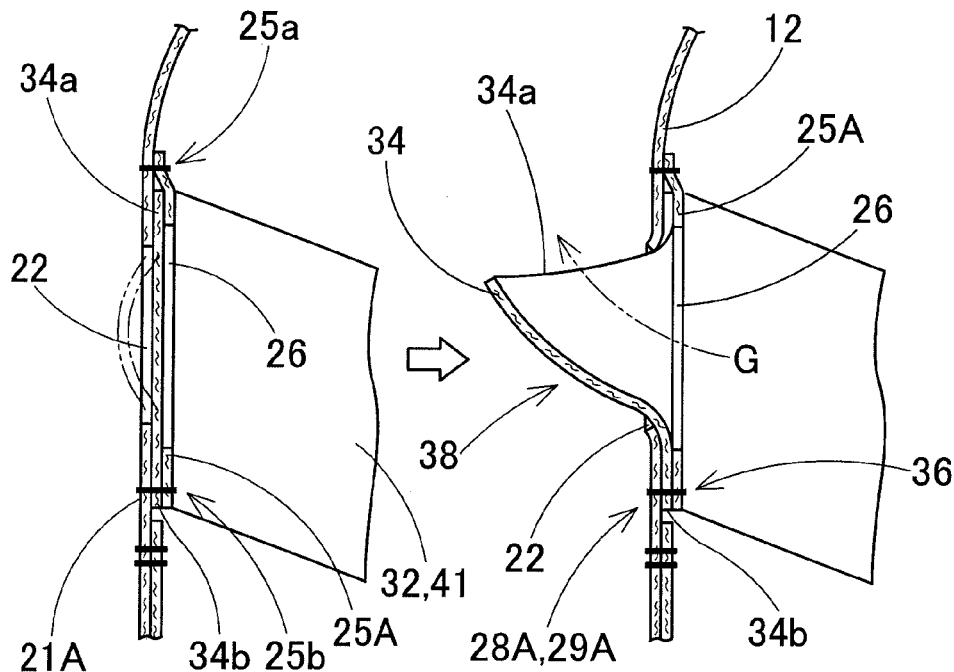
FIG. 11 is a schematic sectional view of the airbag of FIG. 10 taken along line XI-XI in FIG. 10 and also shows the way a vent hole is opened.
Figure 11:
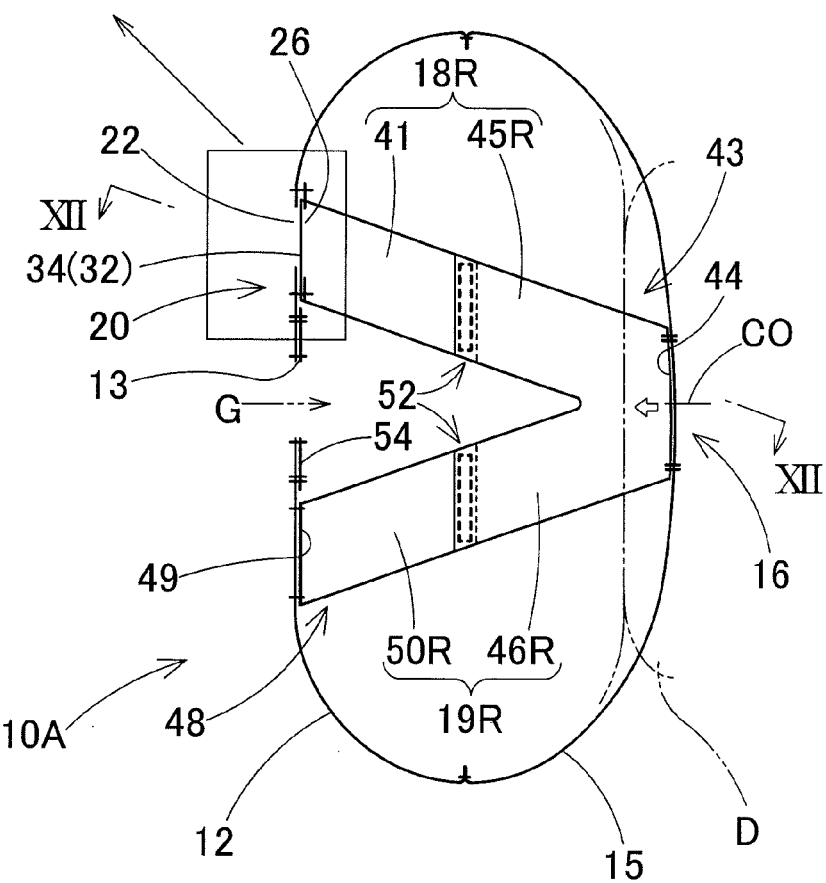
Figure 12A:
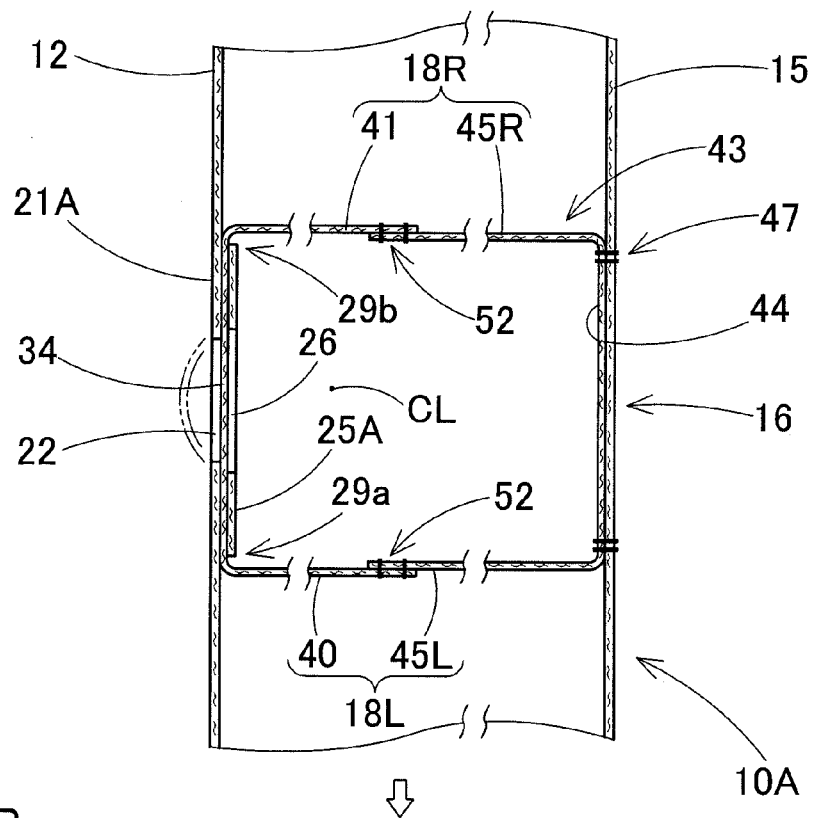
FIGS. 12A and 12B are schematic partial sectional views of the airbag of FIG. 10 taken along line XII-XII in FIG. 11 and also show the vent hole in a closed state and in an open state.
Figure 12B:
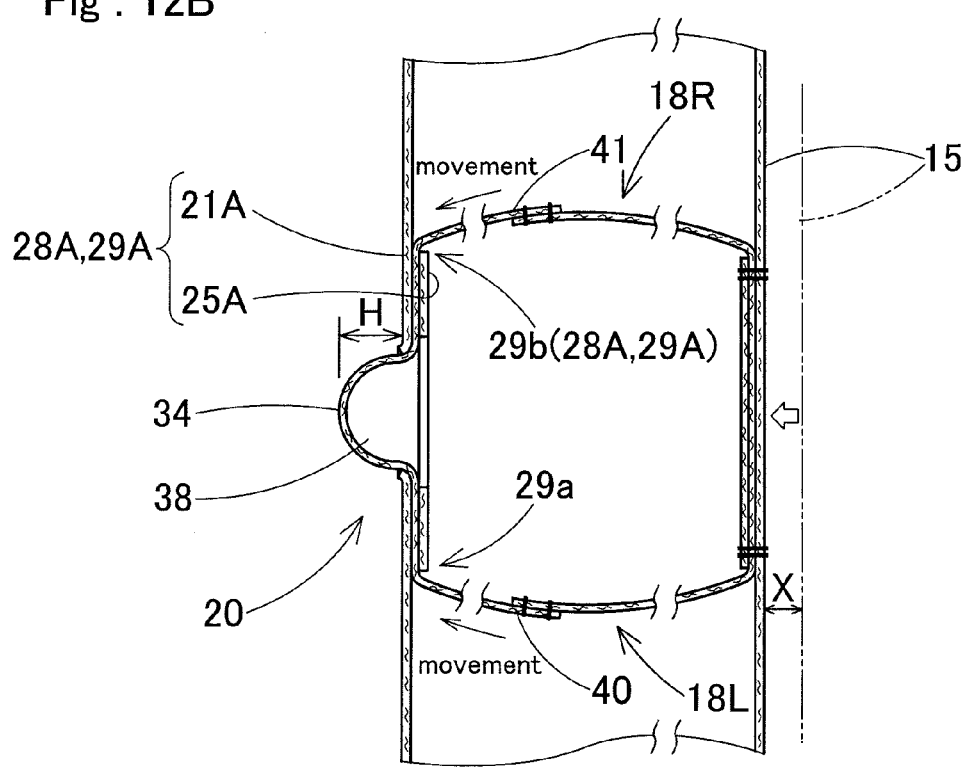
Figure 13A:
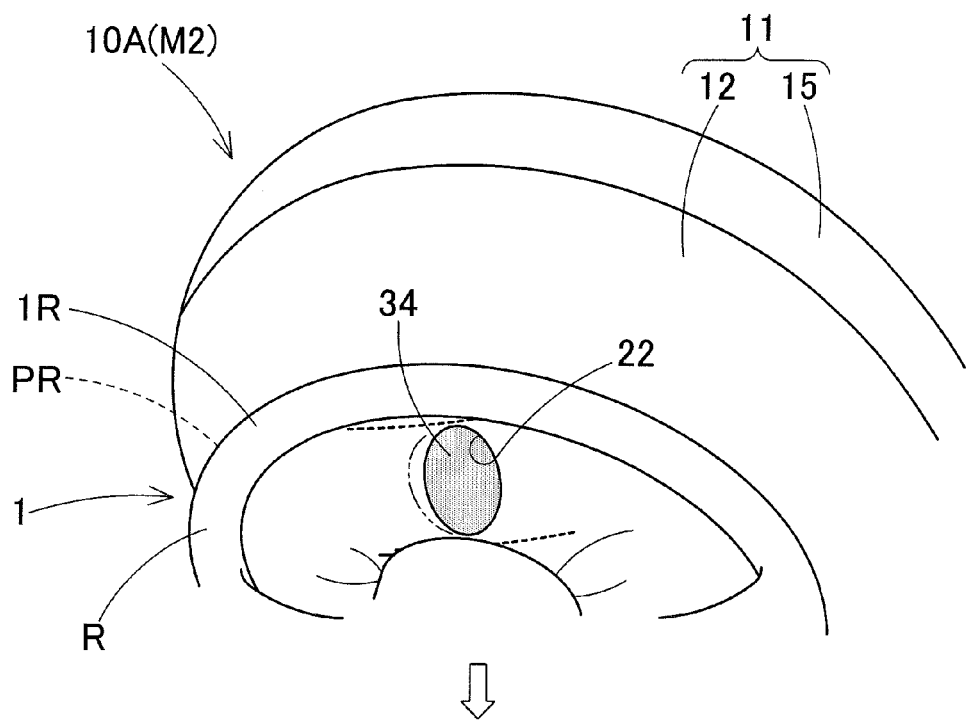
FIGS. 13A and 13B show by perspective views the way the vent hole is opened in the airbag of the second embodiment.
Figure 13B:
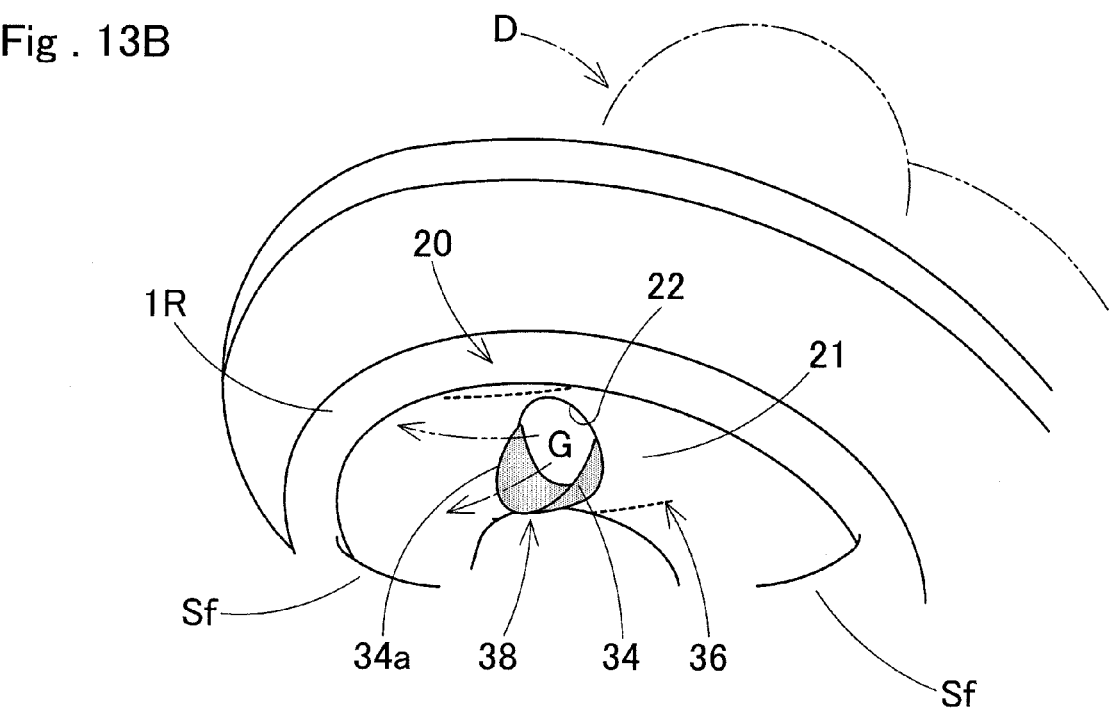
Figure 14:
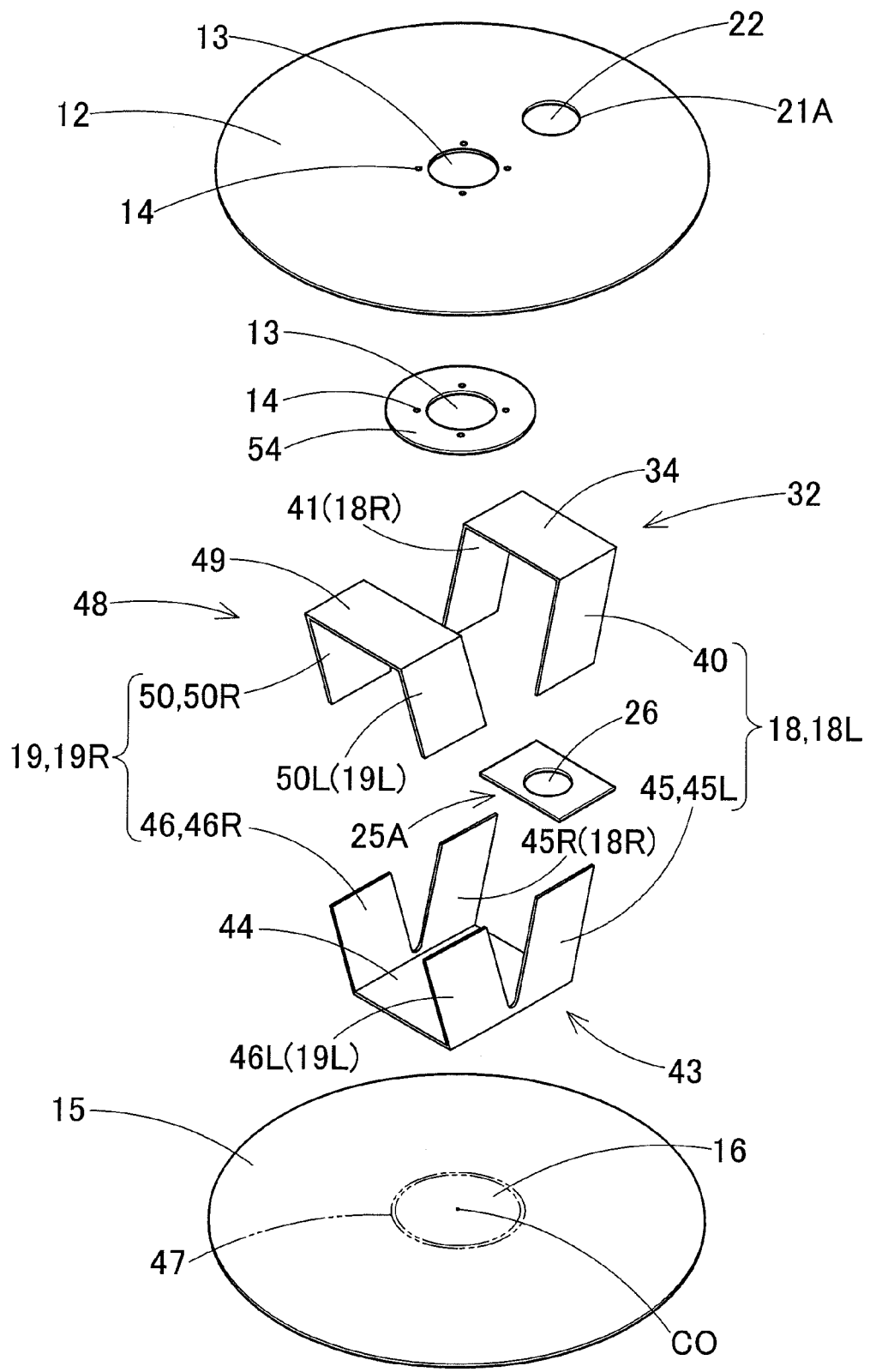
FIG. 14 depicts components of the airbag of the second embodiment by perspective views.

The vehicle body side wall 12 and driver side wall 15 are formed into an identical round shape, and the vehicle body side wall 12 is provided at the center with a round inlet opening 13 for introducing an inflation gas. The circumferential wall 11 is formed by sewing the vehicle body side wall 12 and driver side wall 15 together at the outer peripheries. Around the inlet opening 13 are formed mounting holes 14 for receiving the bolts of the retainer 55 to mount the airbag 10 on the bottom wall 59a of the case 59 (FIG. 9).

A reinforcing cloth 54 is sewn to the periphery of the inlet opening 13. The inlet opening 13 and mounting holes 14 are also formed on the reinforcing cloth 54.

The airbag 10 includes two first tethers 18 (18L, 18R) and two second tethers 19 (19L, 19R) that connect the vehicle body side wall 12 and driver side wall 15 for controlling a clearance between the vehicle body side wall 12 and driver side wall 15 at airbag inflation.

Figure 3:
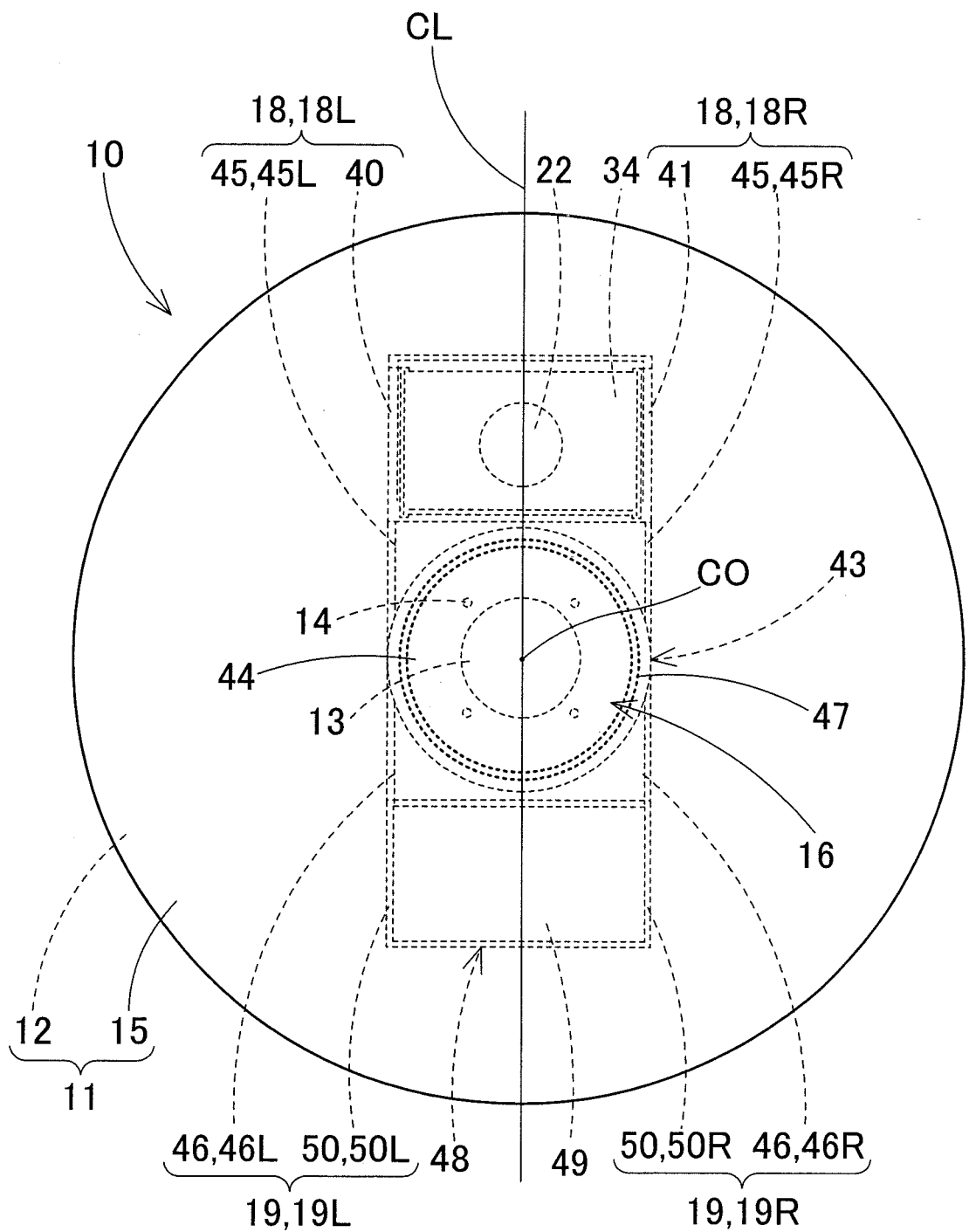
FIG. 3 is a plan view of an airbag of the first embodiment.
Figure 5:
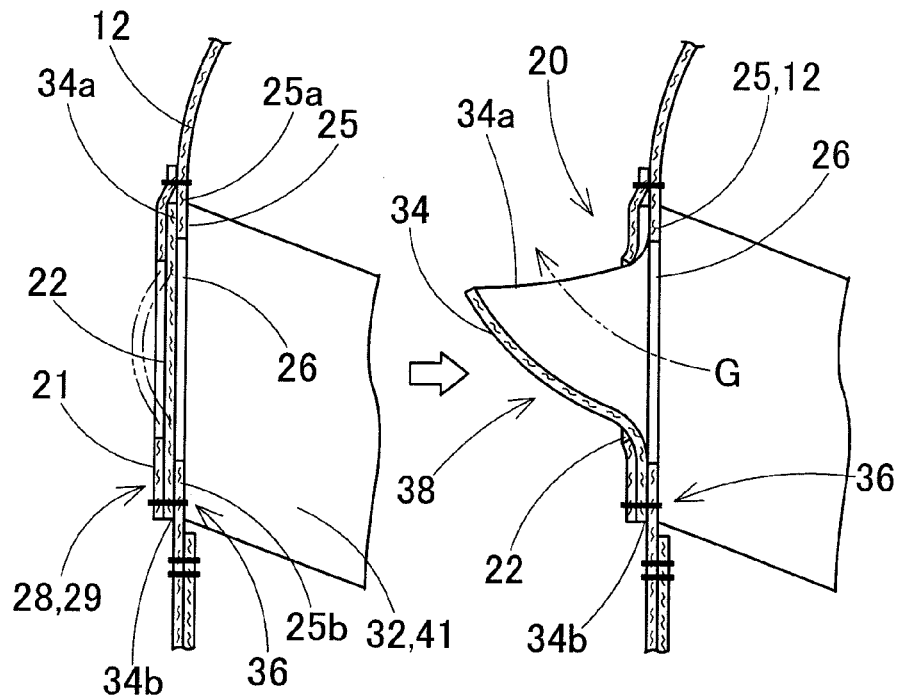
FIG. 5 is a schematic sectional view of the airbag of FIG. 2 taken along line V-V in FIG. 4 and also shows the way a vent hole is opened.
Figure 5:
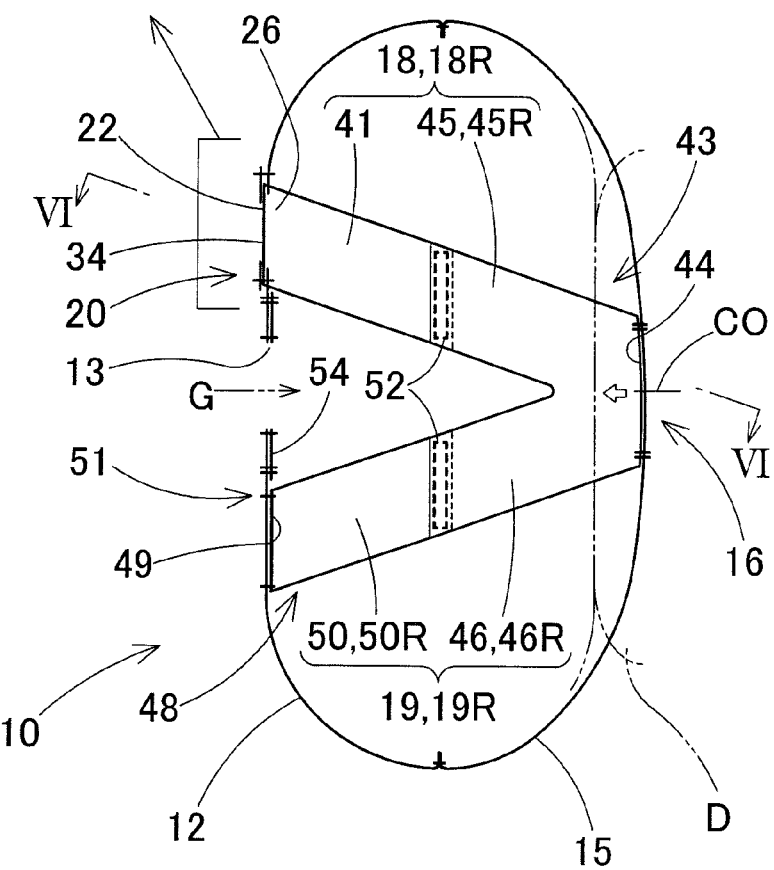

The first tethers 18 (18L, 18R), which constitute part of a vent mechanism, are disposed at a front region of the airbag 10 as inflated and the second tethers 19 (19L, 19R) are disposed at a rear region of the airbag 10 as inflated. As shown in FIGS. 3, 5 and 9, the tethers 18L and 18R are generally symmetric about a straight line connecting the inlet opening 13 and a later-described vent hole 22, as viewed from the side of the driver side wall 15 at full inflation, in other words, generally symmetric about a center line CL of the airbag 10 extending along a front and rear direction, including the width, the length between the walls 12 and 15, the locations connected to the walls 12 and 15, the angles against the walls 12 and 15, and so are the tethers 19L and 19R. Moreover, the tethers 18L and 19L are disposed generally symmetrically in a front and rear direction on opposite sides of the inlet opening 13, as viewed from the side of the driver side wall 15 at full inflation, and so are the tethers 18R and 19R.

Figure 6A:
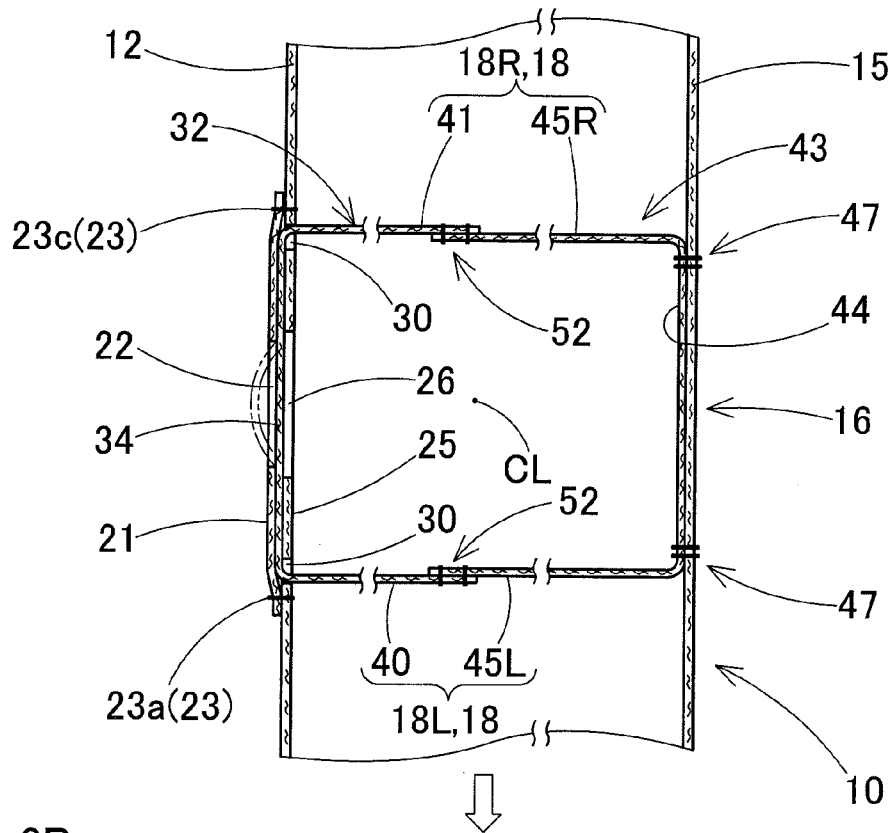
FIGS. 6A and 6B are schematic partial sectional views of the airbag of FIG. 2 taken along line VI-VI in FIG. 5 and also show the vent hole in a closed state and in an open state.

As shown in FIGS. 5, 6 and 9, the first tethers 18L and 18R are composed of a belt member 32 and a driver side tether component 43, and the second tethers 19L and 19R are composed of the driver side tether component 43 and a vehicle body side tether component 48.

Figure 4:
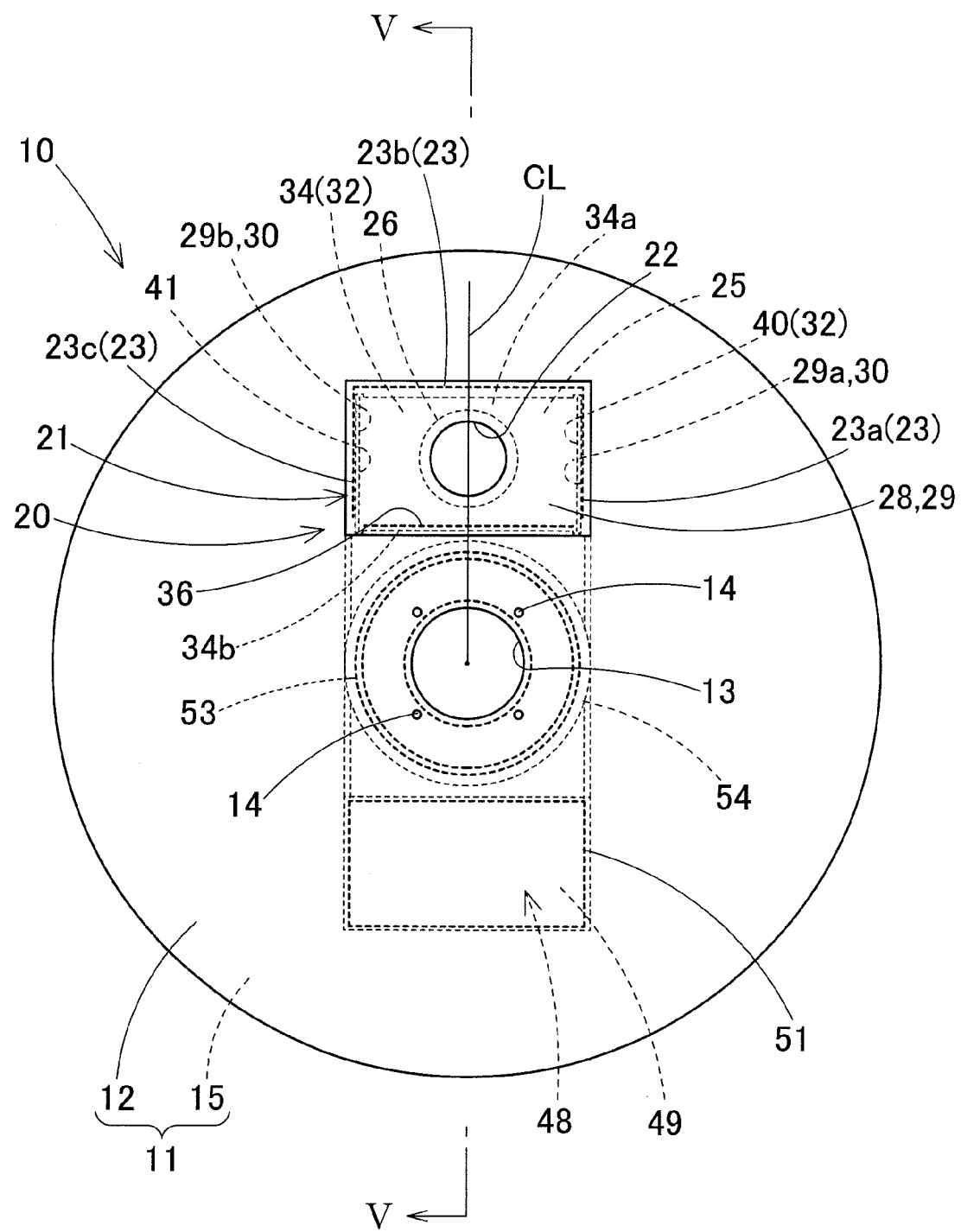
FIG. 4 is a bottom view of the airbag of FIG. 2.

The driver side tether component 43 includes a joint portion 44 which is located at the center and has a rectangular plate shape and two pairs of arms 45 (45L and 45R) and 46 (46L and 46R) which extend from left and right sides of front and rear regions of the joint portion 44. The joint portion 44 is sewn to a central region 16 of the driver side wall 15 with an annular stitch 47 whose center coincides with the center CO of the driver side wall 15. The vehicle body side tether component 48 is formed into a band and includes a joint portion 49 which has a rectangular plate shape and located at the center and two arms 50 (50L and 50R) extending from left and right sides of the joint portion 49. The joint portion 49 is sewn to a rear region of the vehicle body side wall 12 on an inner circumference of the airbag 10 with a generally square annular stitch 51 (FIG. 4). The belt member 32 is formed into a band and includes a cover portion 34 which has a rectangular plate shape and located at the center and connecting sections 40 and 41 extending from left and right sides of the cover portion 34.

The tether 18L/18R is composed by sewing together the arm 45L/45R of the driver side tether component 43, which is sewn to the center of the driver side wall 15, and the connecting section 40/41 of the belt member 32, which runs through a later-described guide section 28 located proximate the vent hole 22 on the vehicle body side wall 12, by a stitch 52 (FIGS. 5 and 6), respectively. That is, the tether 18L is composed of the arm 45L and the connecting section 40, while the tether 18R is composed of the arm 45R and the connecting section 41.

The tether 19L/19R is composed by sewing together the arm 46L/46R of the driver side tether component 43 and the arm 50L/50R of the vehicle body side tether component 48 by a stitch 52 (FIGS. 5 and 6). That is, the tether 19L is composed of the arm 46L and the arm 50L, while the tether 19R is composed of the arm 46R and the arm 50R.

The components of the airbag 10: the reinforcing cloth 54, belt member 32, driver side tether component 43, vehicle body side tether component 48 and a later-described outer panel 21, are fabricated of a flexible woven fabric of such synthetic resin as polyimide or polyester, as well as the vehicle body side wall 12 and driver side wall 15.

In the first embodiment, the joint portion 49 of the vehicle body side tether component 48 and a layout area of later-described slits 30 are symmetric about the inlet opening 13, in a front and rear direction.

Moreover, the joint or stitch 47 which sews the joint portion 44 of the driver side tether component 43 to the driver side wall 15 is located toward the center CO of the driver side wall 15 relative to the vent hole 22 as viewed from the side of the driver side wall 15 at full inflation of the airbag 10 (FIG. 9). In this specific embodiment, the joint 47, which is annular in shape, has a generally same diameter as an annular stitch 53 which sews the reinforcing cloth 54 to a periphery of the inlet opening 13 of the vehicle body side wall 12 and is generally coincident with the stitch 53 as viewed from the side of the driver side wall 15 at full inflation of the airbag 10.

Furthermore, the center CO of the central region 16 the driver side wall 15 is generally coincident with the steering shaft SS as viewed from the side of the driver side wall 15 at full inflation of the airbag 10 as mounted on a vehicle, in other words, generally coincident with a rotation center Sc (FIGS. 1 and 2) of the ring section R of the steering wheel W as is steered. More particularly, as shown in FIGS. 1 and 2, the center CO of the central region 16 of the driver side wall 15 is located slightly to the rear of the rotation center Sc of the steering wheel W as is steered.

The airbag 10 of the airbag apparatus M1 according to the first embodiment includes a vent mechanism 20 that vents an inflation gas from the vent hole 22 when a driver bumps against the driver side wall 15 at actuation of the airbag apparatus M1 and the driver side wall 15 comes close to the vehicle body side wall 12, which is supported by a top plane PR of the ring section R, and an internal pressure of the airbag 10 exceeds a predetermined value.

Referring to FIGS. 4 to 9, the vent mechanism 20 includes an outer panel 21, an inner panel 25, a guide section 28 and the belt member 32 which includes the cover portion 34 for covering the vent hole 22. The outer panel 21 is located on an outer side of the cover portion 34, and the round vent hole 22 is formed on the outer panel 21. The inner panel 25 is located on an inner side of the cover portion 34 and is provided with a round inner opening 26 so an internal pressure of the airbag 10 works on the cover portion 34.

The inner opening 26 and the vent hole 22 are arranged in a concentric fashion with the cover portion 34 located there between.

The belt member 32 passes through the guide section 28, such that the two connecting sections 40 and 41 of the belt member 32 are movable toward the vent hole 22 when the driver side wall 15 cushions the driver and approximates the vehicle body side wall 12 and the cover portion 34 loosens and opens the vent hole 22. Further, when the airbag 10 is inflated, the guide section 28 holds the connecting sections 40 and 41 so the connecting sections 40 and 41 serve as the tethers 18 (18L and 18R).

More particularly, in the first embodiment, the inner panel 25 is composed of a part of the vehicle body side wall 12. The outer panel 21 is formed into a rectangular plate having the vent hole 22 located at the center, and is sewn to an outer peripheral edge of the inner panel 25 (i.e., to the vehicle body side wall 12) by the outer peripheral edge.

The guide section 28 includes on left and right sides of the inner opening 26 on the inner panel 25 (i.e., on the vehicle body side wall 12) each one slit or insert opening 30 extending along a front and rear direction. The guide section 28 is composed of a tubular region 29 formed by the inner panel 25 and outer panel 21 between the two slits 30. The length L1 (FIG. 9) of each of the slits 30 is greater than a diameter D0 of the vent hole 22 and a diameter D1 of the inner opening 26 by a good margin, and is slightly greater than a width B1 of the belt member 32 such that the belt member 32 passes through the slits 30 in a flattened state.

The cover portion 34 of the belt member 32 is located between the outer panel 21 and inner panel 25, and the connecting sections 40 and 41 pass through the slits 30 and protrude from left and right ends 29a and 29b of the tubular region 29.

The cover portion 34 is greater than the inner opening 26 in size so as to cover the vent hole 22 sufficiently. Further, the cover portion 34 is so sized that an outer edge 34a of the cover portion 34 passes through the vent hole 22 when the cover portion 34 receives an internal pressure of the airbag 10 via the inner opening 26 and the connecting sections 40 and 41 loosen.

The vent hole 22 is located at the center in a front and rear direction and in a left and right direction of the cover portion 34 which is positioned by inserting the belt member 32 through the slits 30.

In the first embodiment, furthermore, an outer edge 34a in a width direction of the cover portion 34 (i.e., an outer edge located toward an outer periphery of the airbag 10) is connected neither to the outer panel 21 nor to the inner panel 25, whereas an inner edge 34b in a width direction (i.e., an inner edge located toward the inlet opening 13, i.e, toward the center of the airbag 10) is connected at least to the inner panel 25, as best shown in FIG. 4.

In this specific embodiment, the inner edge 34b is connected not only to the vehicle body side wall 12 (i.e., to the inner panel 25), but also to the outer panel 21 with a straight stitch 36. Accordingly, as shown in FIGS. 4 to 6B, the rectangular outer panel 21 is connected to the vehicle body side wall 12 (inner panel 25) by an entire outer circumference, with the stitch 36 and a stitch 23 (23a, 23b and 23c) which extends over its three sides and thus has a reverse U-shape. The stitch 23a and 23c are located away from the slits 30 and left and right ends of the stitch 36 so as not to touch the cover portion 34 as shown in FIG. 4.

As described above, the connecting sections 40 and 41 of the belt member 32 are respectively connected to the arms 45 (45L and 45R) of the driver side tether components 43 which are joined to the driver side wall 15, and thus constitute the tethers 18L and 18R that control a clearance between the vehicle body side wall 12 and driver side wall 15 at airbag inflation, together with the arms 45L and 45R. On the vehicle body side wall 12, the tethers 18L and 18R are held by the left and right ends 29a and 29b of the tubular region 29, which ends are composed of peripheral edges of the slits 30.

Manufacturing of the airbag 10 is now described. Firstly, the reinforcing cloth 54 and the joint portion 49 of the vehicle body side tether component 48 are joined to predetermined locations on the inner surface of the vehicle body side wall 12, and then the inlet opening 13 and mounting holes 14 are formed. Further, the inner opening 26 and slits 30 are formed on the location of the inner panel 25 on the vehicle body side wall 12. Thereafter, the belt member 32 is inserted firstly through one of the slits 30 and then through the other such that the cover portion 34 is located over the inner opening 26 on the outer surface of the vehicle body side wall 12. Then the outer panel 21 having the vent hole 22 is laid over the cover portion 34 on the outer surface of the vehicle body side wall 12, and is joined to the inner panel 21 with the stitches 23 and 36. The stitch 36 is so made as to sew the outer panel 21, the inner edge 34b of the cover portion 34 and the inner panel 25 together.

In the meantime, the joint portion 44 of the driver side tether component 43 is joined to the central area 16 of the inner surface of the driver side wall 15.

Thereafter, the vehicle body side wall 12 and driver side wall 15 are laid one on the other with the outer surfaces facing each other and sewn together by the outer circumferential edges and the airbag 10 is then reversed inside out via the inlet opening 13. Subsequently, the arms 45, 46, 50 and the connecting sections 40 and 41 are taken out of the inlet opening 13, and then the arm 45L and connecting section 40, the arm 45R and connecting section 41, the arms 46L and 50L, the arms 46R and 50R are joined together, respectively. If then the stitches 52 are put back into the airbag 10 via the inlet opening 13, the airbag 10 is completed.

To assemble the airbag apparatus M1, the retainer 55 is housed inside the airbag 10 such that the bolts of the retainer 55 project out of the mounting holes 14, and then the airbag 10 is folded up. The airbag 10 is then wrapped up by a predetermined material for keeping the folded-up configuration. Then the airbag 10 is set on the bottom wall 59a of the case 59 such that the bolts of the retainer 55 protrude out of the through holes 59c. Subsequently, the inflator body 57a of the inflator 57 is set in the insert hole 59b of the bottom wall 59a from the lower side such that the bolts of the retainer 55 project through the flange 57c. If the bolts of the retainer 55 are fastened with unillustrated nuts, the airbag 10 and the inflator 57 are set in and secured to the case or housing 59, with the aid of the retainer 55. Thereafter, the airbag cover 63 is placed over the case 59 and the side wall 59d of the case 59 and the side wall 65 of the airbag cover 53 are joined together with the aid of rivets 61 or the like, thus the airbag cover 63 is mounted on the case 59. If then an unillustrated horn switch mechanism is attached to the mounting pieces 59e of the case 59, the airbag apparatus M1 is completed. Then unillustrated mounting bases of the horn switch mechanism are used to mount the airbag apparatus M1 on the steering wheel body 1, which has been secured to the steering shaft SS. Thus the airbag apparatus M1 is mounted on a vehicle.

When the airbag apparatus M1 of the first embodiment is actuated and an inflation gas G is fed to the airbag 10 via the inlet opening 13, the airbag 10 inflates as shown in FIGS. 2 and 5, and pushes and opens the doors 64a of the airbag cover 63. Then the airbag 10 protrudes out of the case 59 and covers the top plane PR of the ring section R, as indicated by double-dotted lines in FIG. 2.

When the driver side wall 15 cushions the driver D at airbag inflation and moves toward the vehicle body side wall 12, which is supported by the top plane PR of the ring section R of the steering wheel body 1, the connecting sections 40 and 41 serving as the tethers 18 (18L and 18R) and the tethers 19 (19L and 19R) loosen. In the meantime, as shown in FIGS. 5 to 7B, the cover portion 34 receives an internal pressure of the airbag 10 through the inner opening 26 of the inner panel 25 and loosens outwardly in such a manner as to pass through the vent hole 22, and then slips out of a space between the inner opening 26 and vent hole 22, thereby opening the vent hole 22. Thus an inflation gas G is released from the vent hole 22.

Figure 6B:
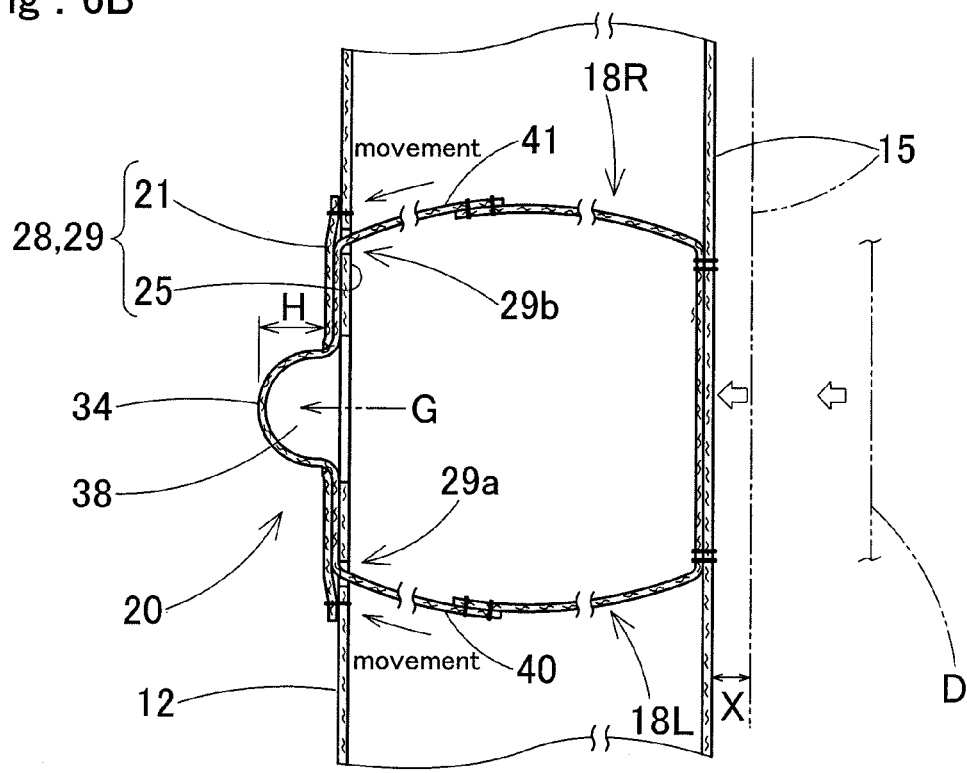

At this time, both of the connecting sections 40 and 41, which extend from opposite sides of the cover portion 34 with the aid of the guide section 28 and are connected to the driver side wall 15 through the medium of the arms 45L and 45R, move toward the vent hole 22, such that the cover portion 34 passes through the vent hole 22. That is, as shown in FIG. 6B, each of the two connecting sections 40 and 41 moves toward the vent hole 22 and runs through the guide section 28 for a distance X that the driver side wall 15 comes close to the vehicle body side wall 12, and accordingly a height H that the cover portion 34 protrudes out of the vent hole 22 is generally equal to the distance X, and which height is generally two times of that of a conventional airbag. As a result, the first embodiment will help open the vent hole 22 more widely than a conventional airbag and release an inflation gas G quickly, such that the airbag 10 will cushion and protect the driver with an adequately suppressed internal pressure.

Figure 8A:
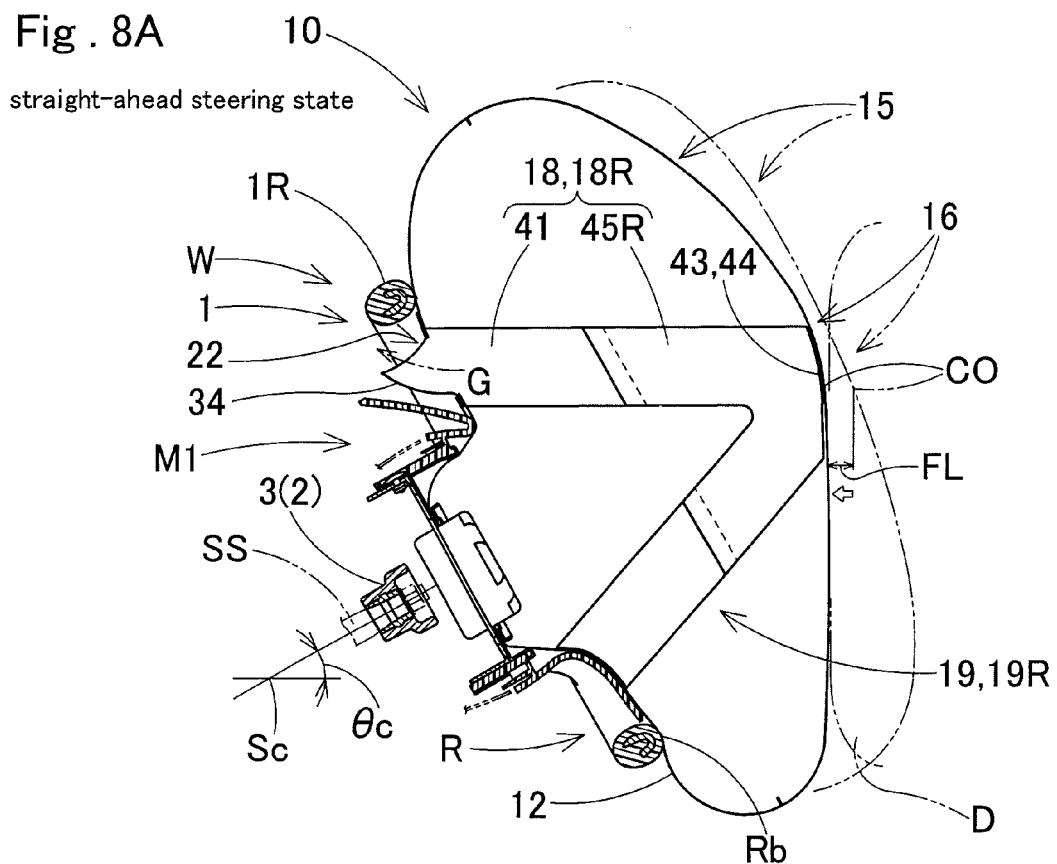
FIG. 8A is a schematic vertical section of a steering wheel being steered straight ahead with the airbag deployed.
Figure 8B:
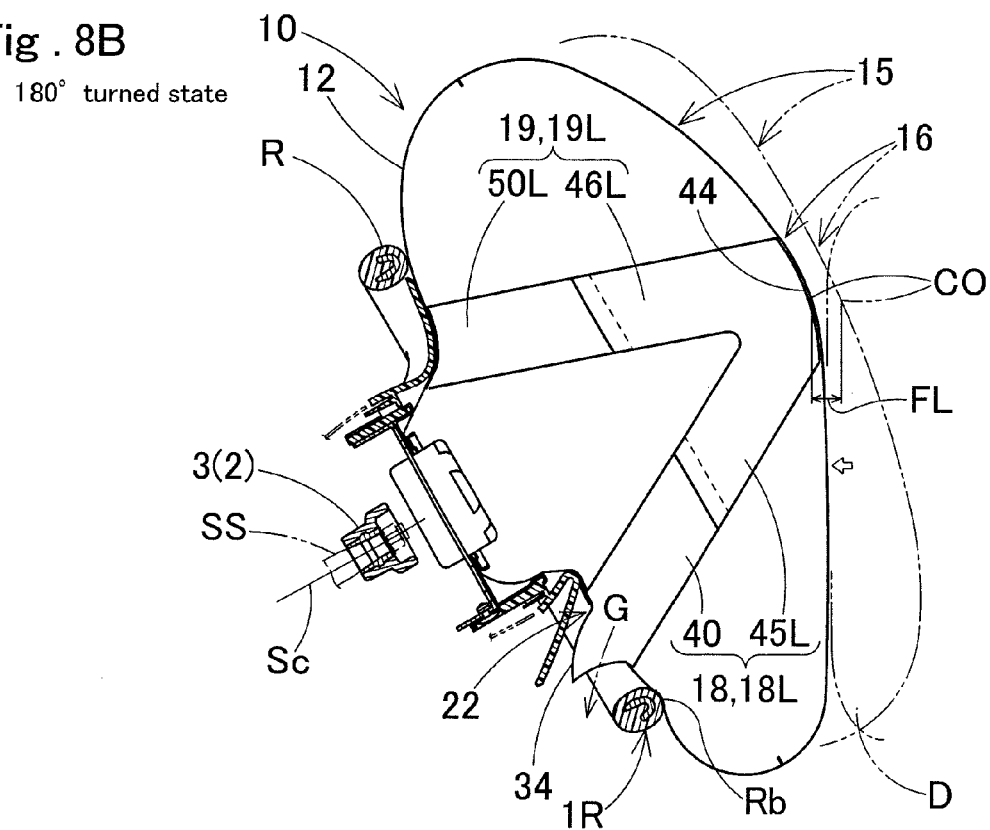
FIG. 8B is a schematic vertical section of the steering wheel turned by 180° with the airbag deployed.

The tethers 18L and 18R include the connecting sections 40 and 41, respectively, and the stitch 47 that connects the joint portion 44 of the tethers 18L and 18R to the driver side wall 15 is located toward the central region 16 of the driver side wall 15 (toward the center CO of the driver side wall 15) relative to the vent hole 22 as viewed from the side of the driver side wall 15 at full inflation of the airbag 10. While steering the ring section R of the steering wheel W with the column angle θc, if the driver D moves toward a lower end Rb of the ring section R which supports the vehicle body side wall 12 of the airbag 10 as is fully inflated and pushes the airbag 10 forward, the steering wheel W may be steered straight ahead as shown in FIG. 8A or may be turned by 180° as shown in FIG. 8B. With the above configuration, however, as shown in FIGS. 8A and 8B, amounts FL of forward movement of a vicinity of the central region 16 of the driver side wall 15 will be generally uniform regardless whether the steering wheel W is steered straight ahead or turned by 180° because the rotation center Sc of the steering wheel W and the center CO of the driver side wall 15 are generally coincident. As a result, however much be a steering angle at actuation of the airbag apparatus M1, a loosening amount of the tethers 18 at cushioning the driver D will be generally steady and the vent hole 22 will open corresponding to the amount FL of forward movement of the driver D, thereby attaining a steady opening performance of the vent hole 22.

Therefore, the airbag apparatus M1 according to the first embodiment will be capable of releasing an inflation gas G quickly despite of the configuration that the vent hole 22 is opened with the aid of loosening of the tethers 18L and 18R, and attain a steady opening performance of the vent hole 22 however much be a steering angle at actuation.

In the first embodiment, moreover, the two connecting sections 40 and 41 are arranged symmetrically about the straight line CL that connects the vent hole 22 and the inlet opening 13 of the airbag 10 for introducing an inflation gas G, as viewed from the side of the driver side wall 15 at full inflation of the airbag 10.

Figure 7A:
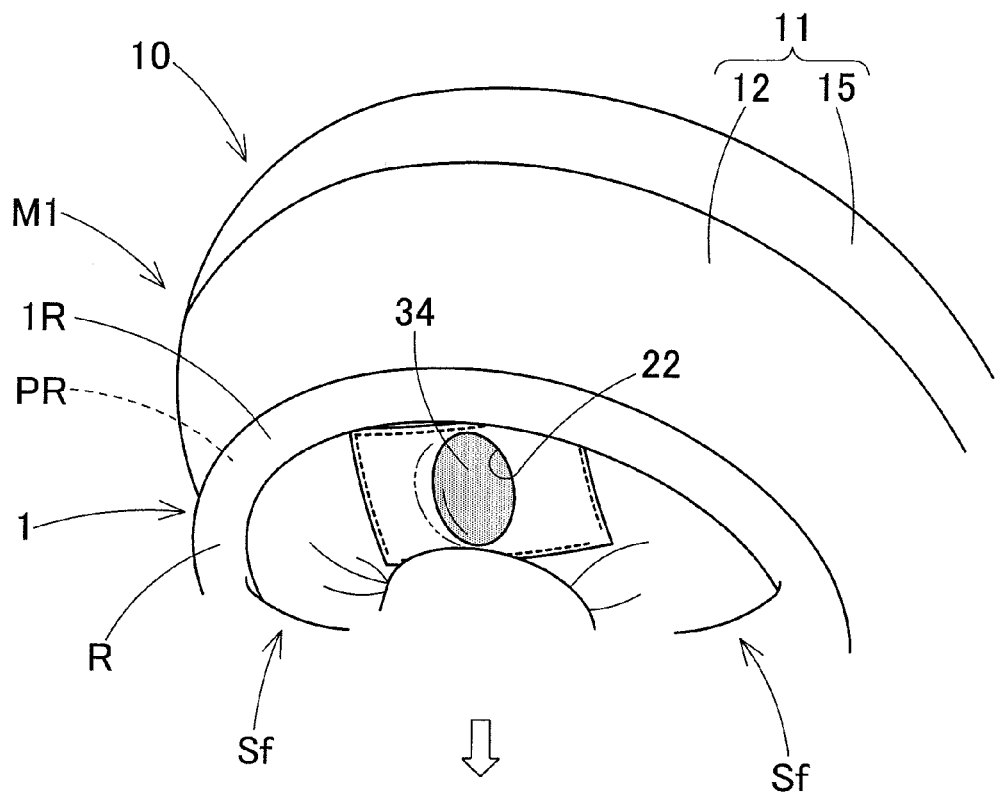
FIGS. 7A and 7B show by perspective views the way the vent hole is opened in the airbag of the first embodiment.
Figure 7B:
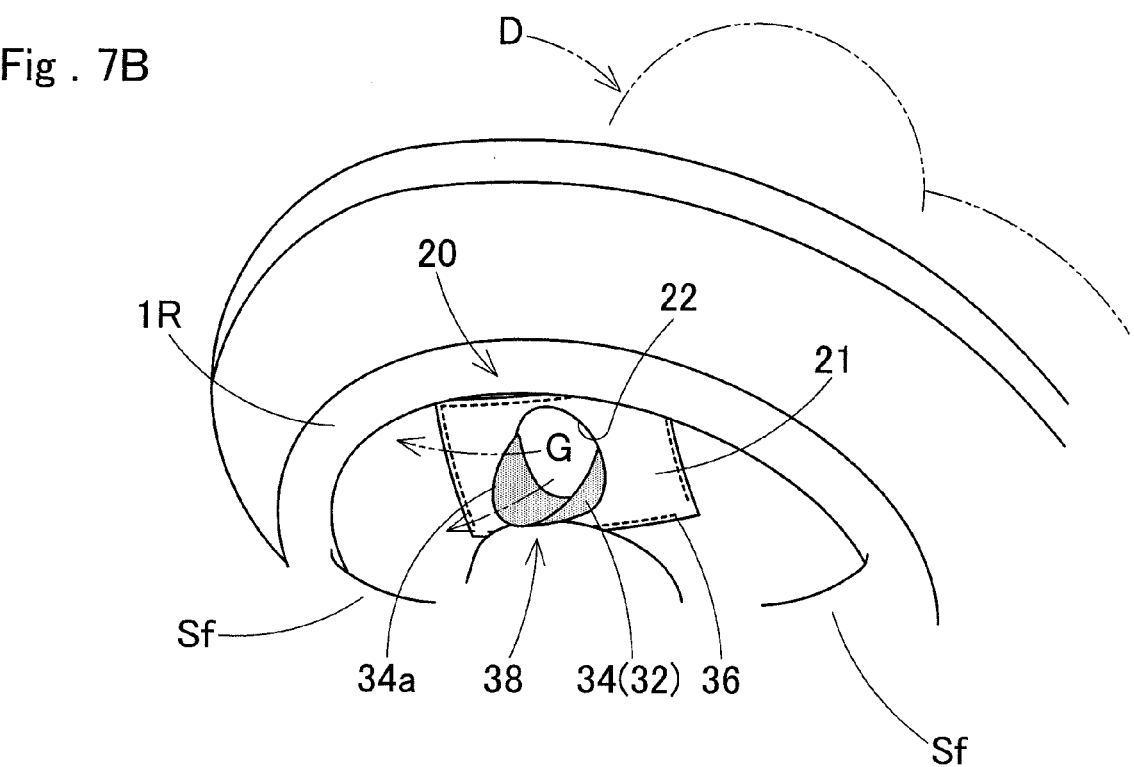

With this configuration, the two connecting sections 40 and 41 are arranged in a concentric fashion about the inlet opening 13, and equally distant from the inlet opening 13. Therefore, when the driver side wall 15 cushions the driver and moves toward the vehicle body side wall 12, the loosening amounts of the connecting sections 40 and 41 and the amounts that the connecting sections 40 and 41 move when the cover portion 34 passes through the vent hole 22 will be equal in a steady fashion. As a result, as shown in FIGS. 6B and 7B, the vent hole 22 will be formed with a curve 38 which curves bilaterally symmetrically and this opening fashion of the vent hole 22 will be steady in every airbag 10.

In the airbag apparatus M1 of the first embodiment, the airbag 10 further includes the second tethers 19L and 19R that are connected to the vehicle body side wall 12 and driver side wall 15 in a symmetric fashion to the tethers 18L and 18R about the inlet opening 13 as viewed from the side of the driver side wall 15 at full inflation of the airbag 10. More particularly, the tether 18L and the tether 19L are symmetric about the inlet opening 13 in a front and rear direction and so are the tether 18R and the tether 19R. Further, as described above, the left and right tethers 18L and 18R are symmetric about the inlet opening 13 in a left and right direction and so are the tethers 19L and 19R.

With this configuration, a clearance between the driver side wall 15 and vehicle body side wall 12 of the airbag 10 are controlled in a balanced fashion at airbag inflation by a pair of the first tethers 18L and 18R and a pair of the second tethers 19L and 19R. If the airbag 10 requires any other tethers in addition to the first tethers 18L and 18R having the connecting sections 40 and 41 for controlling a clearance between the driver side wall 15 and vehicle body side wall 12, this configuration with the four tethers 18L, 18R, 19L and 19R will help inflate the airbag 10 in a balanced fashion with limited number of tethers.

Moreover, in the airbag apparatus M1 of the first embodiment, the vent hole 22 is so designed as to be located in front of the inlet opening 13 and at a space between the boss section B and the ring section R of the steering wheel W at airbag deployment. Further, the connecting sections 40 and 41 are located at left and right sides of the cover portion 34 and the outer edge (or front edge) 34a in a width direction and in a front and rear direction of the cover portion 34 is connected neither to the outer panel 21 nor to the inner panel 25, whereas the inner edge (or rear edge) 34b in a width direction is connected at least to the inner panel 25 with the stitch 36.

With this configuration, a fixed peripheral region of the cover portion 34, i.e., the outer edge or front edge 34a that faces away from the inlet opening 13, will pass through the vent hole 22 for letting out an inflation gas G. When the vent hole 22 is opened, as shown in FIG. 7, the cover portion 34 will be formed into the curve 38 shaped like a tapering half pipe, and the tapering half pipe will be located at a space between front spokes Sf inside the ring section R, i.e., inside the front region 1R of the steering wheel body 1. Therefore, the vent hole 22 will exhaust an inflation gas G smoothly toward a large space in the front.

Further, since the belt member 32 is connected to a region of the inner panel 25 of the vehicle body side wall 12 by the inner edge (or rear edge) 34b of the cover portion 34, the connecting sections 40 and 41 will be prevented from slipping through the guide section 28 freely while the airbag 10 is folded up, which slipping would change substantial lengths of the connecting sections 40 and 41. Therefore, this configuration will help stabilize the lengths of the connecting sections 40 and 41 projecting out of the guide section 28 and facilitate the folding work of the airbag 10 by fixing the location and posture of the belt member 32.

In the first embodiment, furthermore, the inner panel 25 of the vent mechanism 20 is composed of a part of the vehicle body side wall 12. The outer peripheral edge of the outer panel 21 of the vent mechanism 20 is connected to the outer peripheral edge of the inner panel 25 which is a part of the vehicle body side wall 12. The guide section 28 is composed of the tubular region 29 that includes on the left and right sides of the inner opening 26 two slits (insert openings) 30, and is formed of the inner panel 25 and outer panel 21 between the two slits 30. Further, the cover portion 34 of the belt member 32 is located between the outer panel 21 and the inner panel 25 and the connecting sections 40 and 41 run through the slits 30, respectively, so as to protrude out of left and right ends 29a and 29b of the tubular region 29.

This configuration will serve to reduce the number of components of the vent mechanism 20, because the inner panel 25 of the vent mechanism 20 is composed of a part of the vehicle body side wall 12, which forms the circumferential wall 11 of the airbag 10, and the tubular region 29 serving as the guide section 28 is also formed by the two slits 30 formed on the vehicle body side wall 12.

Moreover, since the vent hole 22 is formed on the outer panel 21 that is prepared separate from the vehicle body side wall 12 or driver side wall 15, the shape of the vent hole 22 can be easily changed without changing the inner opening 26 on the inner panel 25, i.e., on the vehicle body side wall 12. That is, a design change of the vent hole 22 will be easily handled by changing the outer panel 21, which is a small component.

Nevertheless, the outer panel on which the vent hole is to be formed may also be composed of a vehicle body side wall of the airbag, as in an airbag 10A of an airbag apparatus M2 according to the second embodiment of the invention.

Referring to FIGS. 10 to 14, the vent mechanism 20 of the airbag 10A includes an outer panel 21A that is a part of the vehicle body side wall 12, and an inner panel 25A which is formed into a rectangular plate and has a round inner opening 26 at the center. The inner panel 25A is connected to an inner surface of the vehicle body side wall 12.

Opposite edges (front and rear edges) 25a and 25b of the inner panel 25A in a width direction and in a front and rear direction of the cover portion 34 are joined to the vehicle body side wall 12, in the second embodiment, the guide section 28A is composed of a tubular region 29A that is formed of the inner panel 25A and the outer panel 21A between the joints of the front and rear edges 25a and 25b of the inner panel 25A.

The belt member 32 is so arranged that the cover portion 34 is located between the outer panel 21A and inner panel 25A and the connecting sections 40 and 41 protrude out of left and right ends 29a and 29b of the tubular region 29A. Further, the connecting sections 40 and 41 are connected to the central region 16 of the driver side wall 15 with an annular stitch 47 through the medium of arms 45L and 45R of a driver side tether component 43.

Similarly to the first embodiment, each of second tethers 19L and 19R arranged on a rear side of the airbag 10A is composed of an arm 50L/50R of a vehicle body side tether component 48 and an arm 46L/46R of the driver side tether component 43.

The airbag apparatus M2 according to the second embodiment is mounted on a steering wheel body and uses the same retainer, inflator, case, rivets and airbag cover as in the first embodiment.

With the second embodiment, when the driver side wall 15 cushions the driver D at airbag deployment and moves toward the vehicle body side wall 12, which is supported by the top plane PR of the ring section R of the steering wheel body 1, the connecting sections 40 and 41 serving as the tethers 18 (18L and 18R) and tethers 19 (19L and 19R) loosen. Then as shown in FIGS. 11 to 13B, the cover portion 34 receives an internal pressure of the airbag 10A through the inner opening 26 of the inner panel 25A and loosens outwardly in such a manner as to pass through the vent hole 22, and then slips out of a space between the inner opening 26 and vent hole 22, thereby opening the vent hole 22. Thus an inflation gas G is released forward out of the vent hole 22 deployed inside the front region 1R of the steering wheel body 1 (FIGS. 11 to 13B).

When the cover portion 34 passes through the vent hole 22, the two connecting sections 40 and 41, which extend from opposite sides of the cover portion 34 with the aid of the tubular region 29A serving as the guide section 28A and are connected to the driver side wall 15 through the medium of the arms 45L and 45R, move toward the vent hole 22 along with the cover portion 34. That is, each of the connecting sections 40 and 41 moves toward the vent hole 22 and runs through the tubular region 29A for a distance X that the driver side wall 15 comes close to the vehicle body side wall 12, and accordingly the height H that the cover portion 34 protrudes out of the vent hole 22 is generally equal to the distance X, and which height is generally two times of that of a conventional airbag. As a result, the second embodiment will also help open the vent hole 22 widely and release an inflation gas quickly, such that the airbag 10A will cushion and protect the driver D with an adequately suppressed internal pressure.

Therefore, as in the first embodiment, the airbag apparatus M2 according to the second embodiment will be capable of releasing an inflation gas G quickly despite of the configuration that the vent hole 22 is opened with the aid of loosening of the tethers 18L and 18R, and further attain a steady opening performance of the vent hole 22 regardless of a steering angle at actuation since the tethers 18L and 18R are connected to the central region 16 of the driver side wall 15.

In the second embodiment, the outer panel 21A of the vent mechanism 20 is composed of a part of the vehicle body side wall 12, which constitutes the circumferential wall 11 of the airbag 10A, and the tubular region 29A serving as the guide section 28A is formed only by connecting the opposite edges 25a and 25b of the inner panel 25A to the vehicle body side wall 12. Therefore, the vent mechanism 20 will be formed simply with limited number of components.

Also in the second embodiment, the two connecting sections 40 and 41 are arranged symmetrically about a straight line CL that connects the vent hole 22 and the inlet opening 13 of the airbag 10A, as viewed from the side of the driver side wall 15 at full inflation of the airbag 10A. As in the first embodiment, with this configuration, the two connecting sections 40 and 41 are arranged in a concentric fashion about the inlet opening 13, and equally distant from the inlet opening 13. Therefore, when the driver side wall 15 cushions the driver D and moves toward the vehicle body side wall 12, the connecting sections 40 and 41 loosen equally and the amounts that the connecting sections 40 and 41 move when the cover portion 34 passes through the vent hole 22 are equal in a steady fashion. As a result, the vent hole 22 will be formed with a curve 38 that curves bilaterally symmetrically and this opening fashion of the vent hole 22 will be steady in every airbag 10A.

Furthermore, the outer edge or front edge 34a in a width direction of the cover portion 34 is connected neither to the outer panel 21A nor to the inner panel 25A, whereas the inner edge or rear edge 34b in a width direction of the cover portion 34 is connected at least to the inner panel 25A with a stitch 36. In the second embodiment, the stitch 36 sews the inner edge 34b of the cover portion 34 as well as the rear edge 25b of the inner panel 25A together to the outer panel 21A (i.e., to the vehicle body side wall 12).

With this configuration, similarly to the first embodiment, a specific edge, i.e., the outer edge 34a, which is not connected to the inner panel 25A, will pass through the vent hole 22 and open the vent hole 22, and therefore, the opening fashion of the vent hole 22 will be stabilized.

Further, since the belt member 32 is connected to the vehicle body side wall 12 by the inner edge (or rear edge) 34b of the cover portion 34 with the medium of the inner panel 25, the connecting sections 40 and 41 will be prevented from slipping through the guide section 28A freely while the airbag 10A is folded up, which slipping would change substantial lengths of the connecting sections 40 and 41. Therefore, this configuration will help stabilize the lengths of the connecting sections 40 and 41 projecting out of the guide section 28A and facilitate the folding work of the airbag 10A by fixing the location and posture of the belt member 32.

Figure 17:
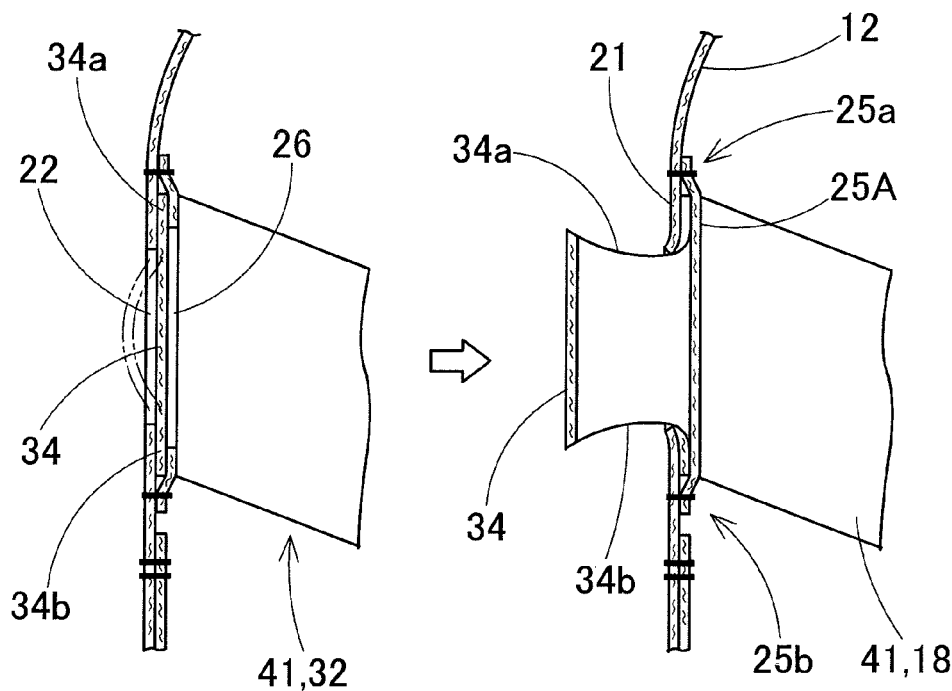
FIG. 17 is a schematic sectional view of a modification of the airbag of the second embodiment and also shows the way a vent hole is opened.
Figure 17:
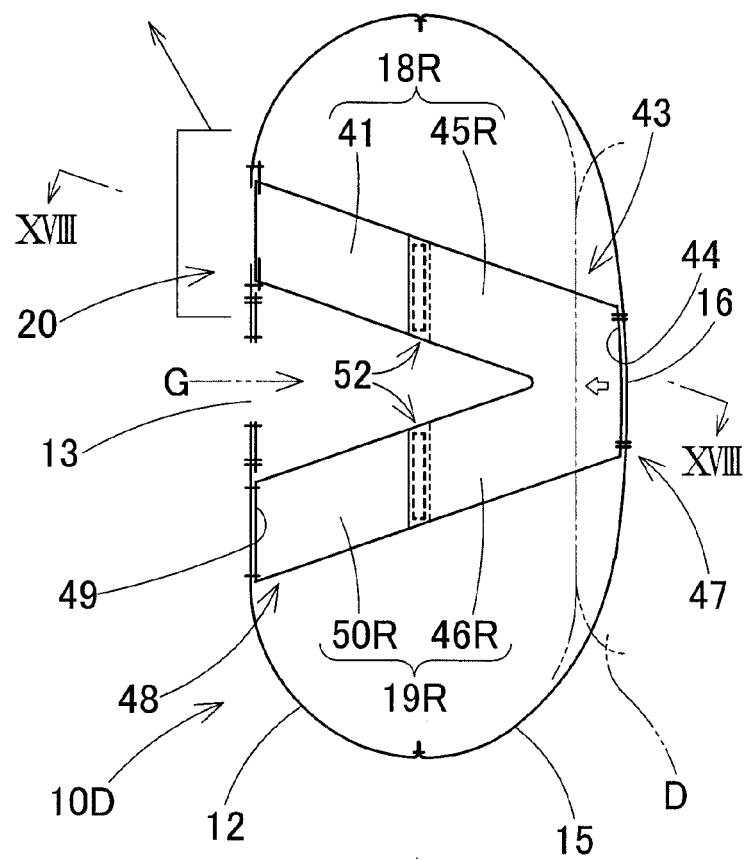
Figure 18A:
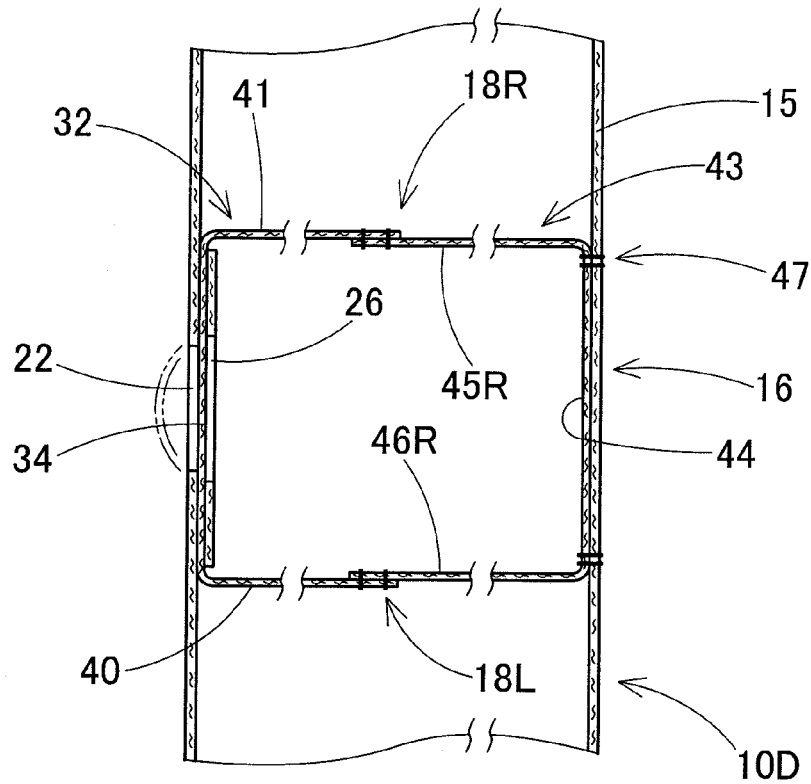
FIGS. 18A and 18B are schematic partial sectional views of the airbag of FIG. 17 taken along line XVIII-XVIII in FIG. 17 and also show the vent hole in a closed state and in an open state.
Figure 18B:
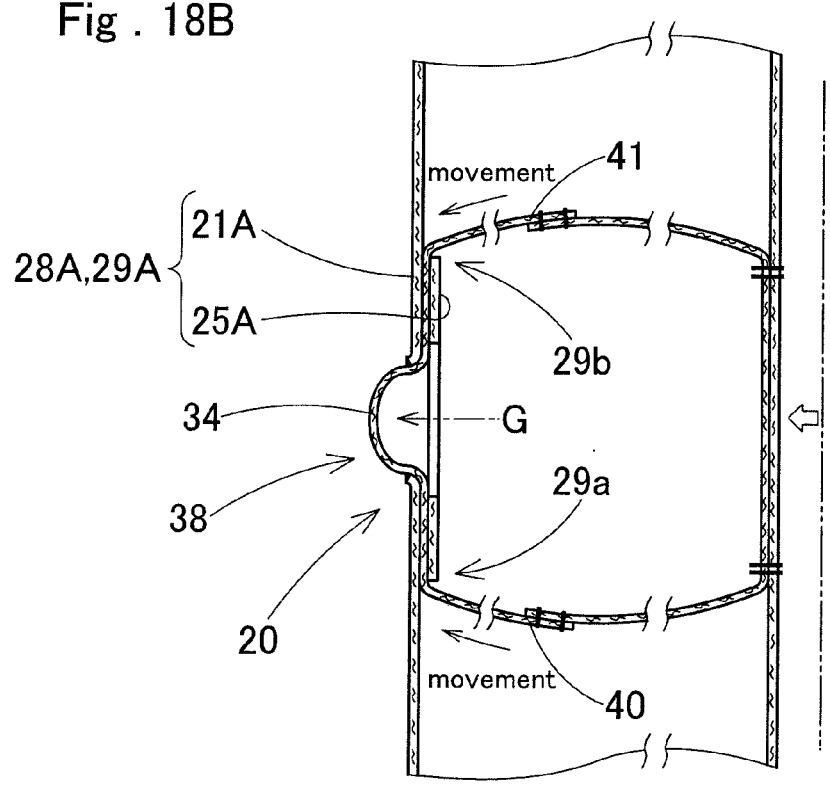

If such an advantage does not have to be considered, the cover portion 34 may be unfixed to the inner panel 25A and outer panel 21A. FIGS. 17 to 18B depict a modification of the second embodiment, an airbag 10D. In the airbag 10D, both inner and outer edges 34b and 34a of the cover portion 34 are not connected to the inner panel 25A or to the outer panel 21A.

Figure 15:
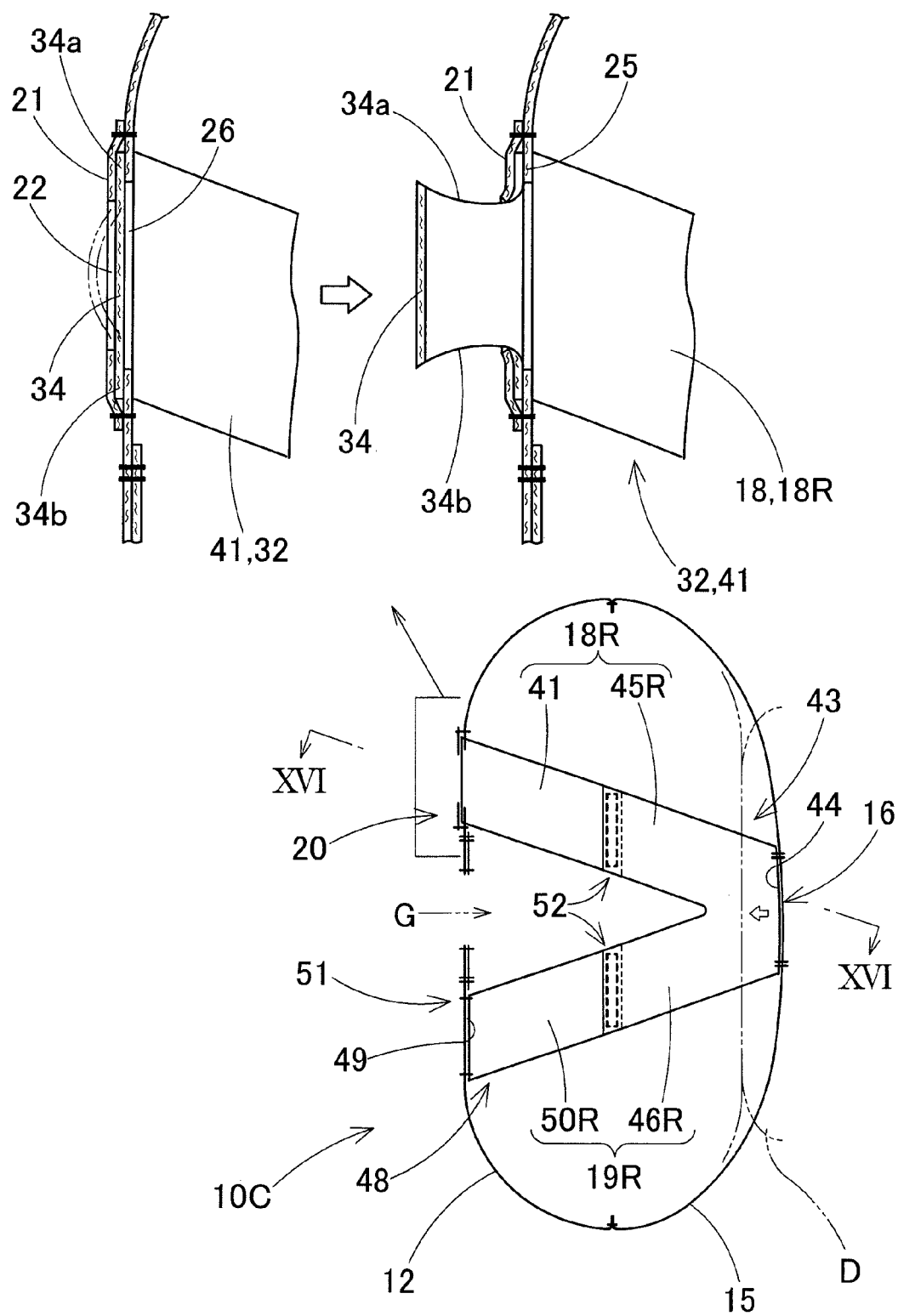
FIG. 15 is a schematic sectional view of a modification of the airbag of the first embodiment and also shows the way a vent hole is opened.
Figure 16A:
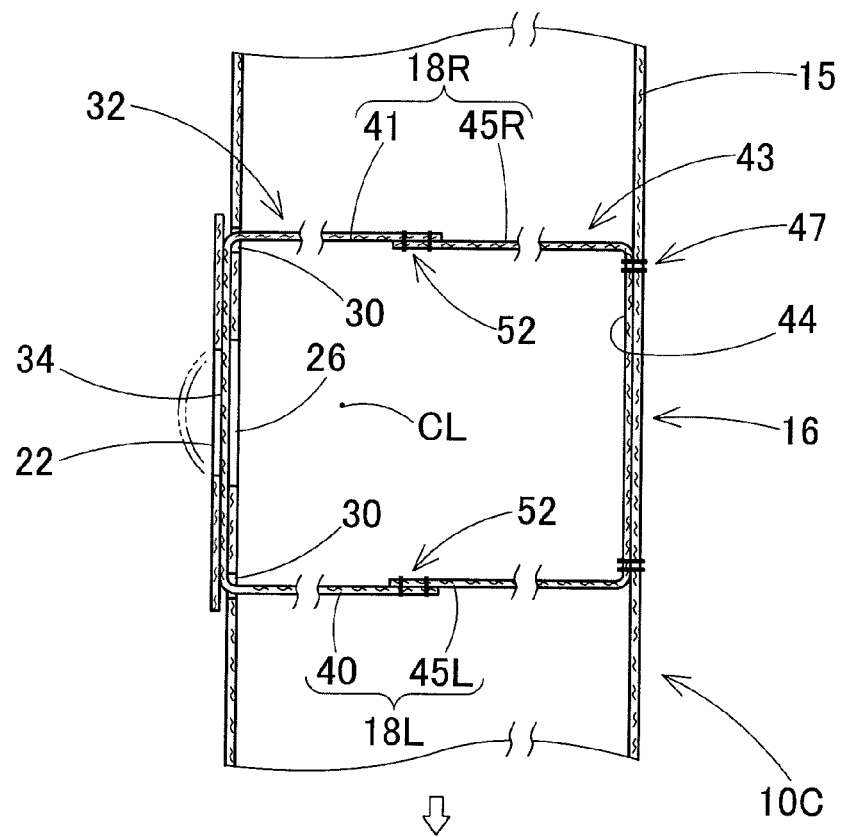
FIGS. 16A and 16B are schematic partial sectional views of the airbag of FIG. 15 taken along line XVI-XVI in FIG. 15 and also show the vent hole in a closed state and in an open state.
Figure 16B:
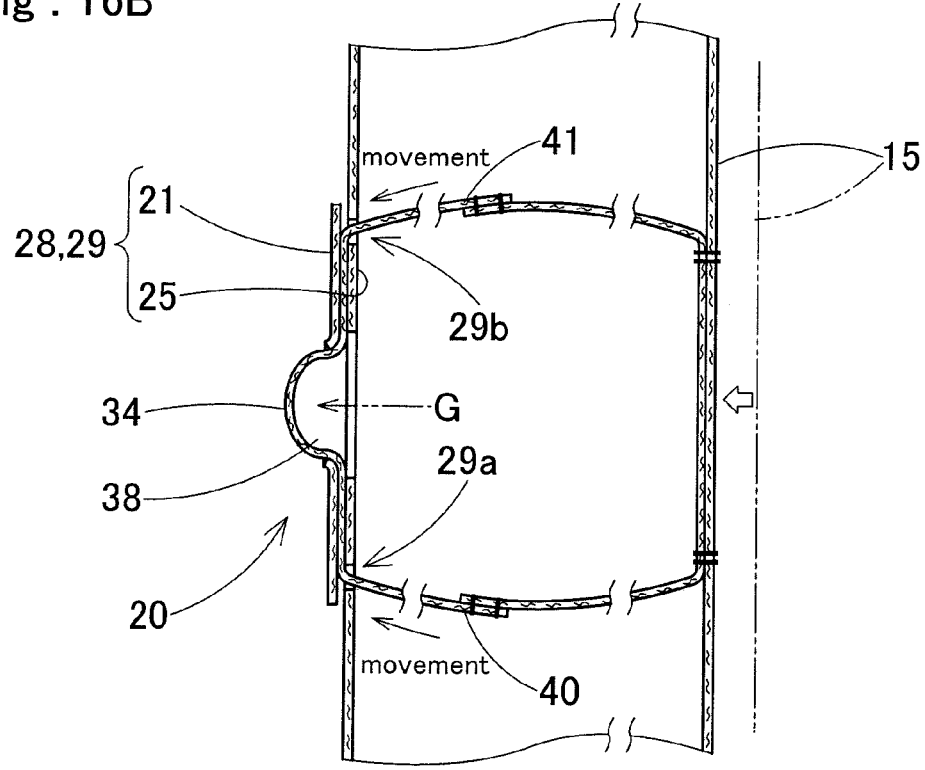

FIGS. 15 to 16B depict an airbag 10C, a similar modification of the first embodiment. The inner edge (rear edge) 34b of the cover portion 34 of the airbag 10C is not connected to the inner panel 25 or the outer panel 21, as well as the outer edge (front edge) 34a.

In the airbag 10A of the second embodiment, both edges 25a and 25b of the inner panel 25A are joined to an inner surface of the outer panel 21A (i.e., the vehicle body side wall 12), and the belt member 32 runs through the tubular region 29A (i.e., the guide section 28A) and the inner edge 34b of the cover portion 34 is connected to the inner panel 25A. In manufacturing such an airbag 10A, the belt member 32, and then the inner panel 25A are placed on the inner surface of the vehicle body side wall 12, and then the edge 25a, and the other edge 25b of the inner panel 25A are sewn to the vehicle body side wall 12 together with the inner edge 34b of the of the cover portion 34. Thus the tubular region 29A is formed at the same time as the cover portion 34 is positioned inside the tubular region 29A.

Figure 19:
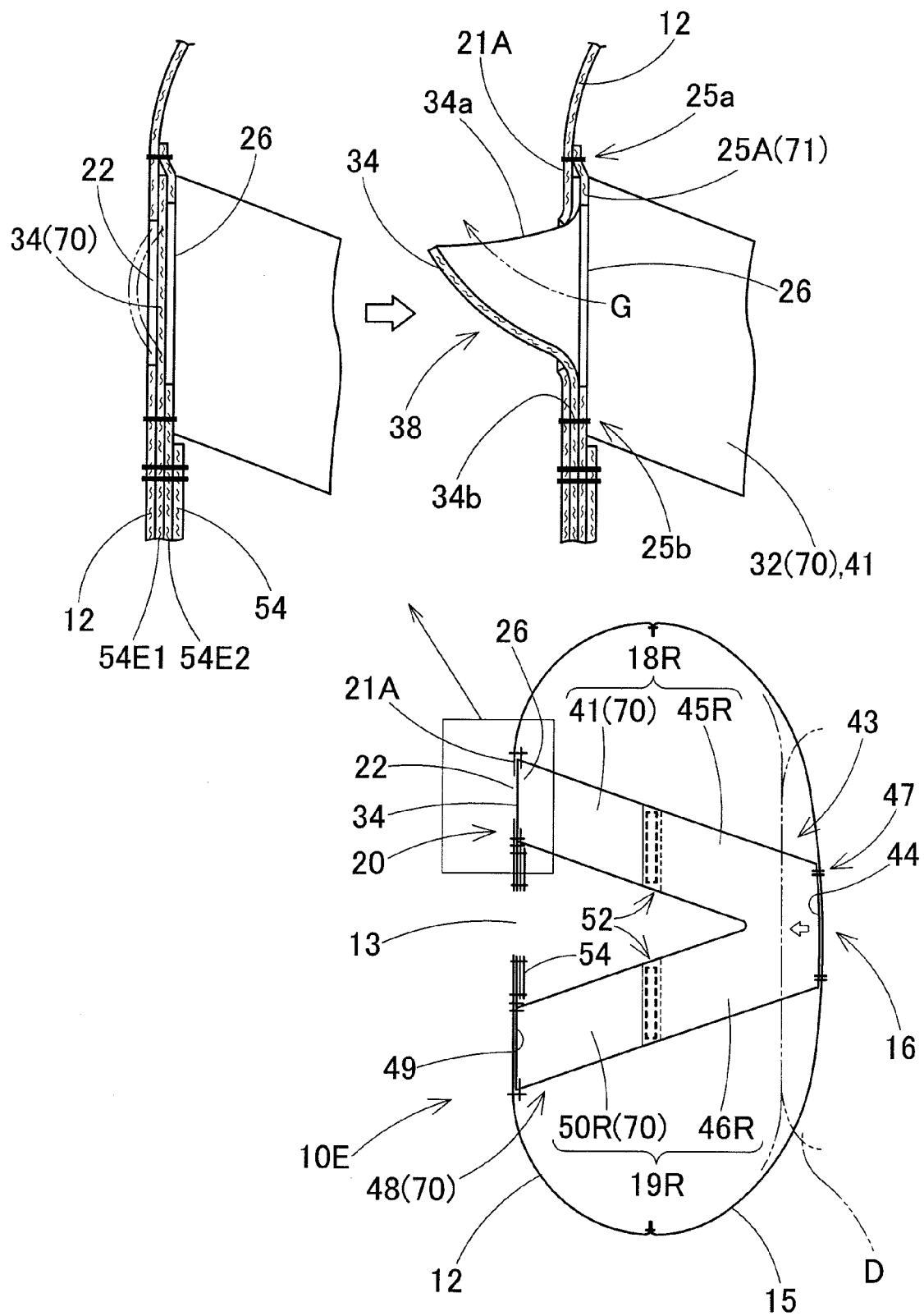
FIG. 19 is a schematic sectional view of yet another modification of the airbag of the second embodiment and also shows the way a vent hole is opened.
Figure 20:
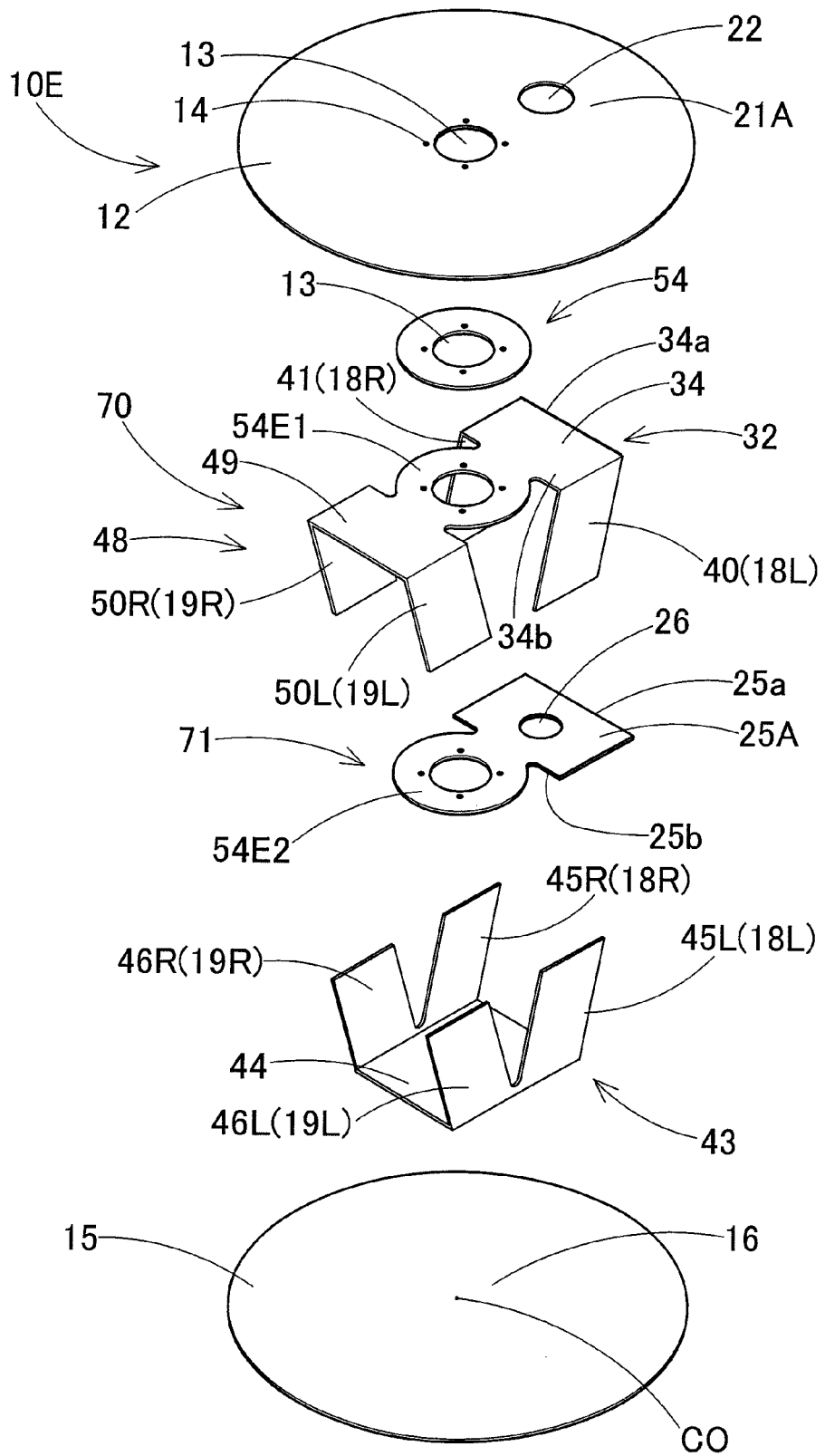
FIG. 20 schematically depicts components of the airbag of FIG. 19 by perspective views.

FIGS. 19 and 20 depict an airbag 10E, a further alternative embodiment. The airbag 10E includes an internal member 70 that is an all-in-one member in which a belt member 32, a second reinforcing cloth 54E1 to be located in a periphery of the inlet opening 13 and a vehicle body side tether component 48 are integrated. The internal member 70 is joined (by way of example, sewn) to an inner surface of the vehicle body side wall 12 by a predetermined region. In the illustrated embodiment, a second internal member 71, in which an inner panel 25A and a third reinforcing cloth 54E2 are integrated, is also provided.

To manufacture the airbag 10E, the internal member 70, the second internal member 71 having an inner opening 26 and then the reinforcing cloth 54 are placed in order on the vehicle body side wall 12 provided with a vent hole 22. Then the reinforcing cloth 54 and regions of the second and third reinforcing cloths 54E1 and 54E2 are sewn to the vehicle body side wall 12, and the front edge 25a, and the rear edge 25b of the inner panel 25A together with the inner edge 34b of the cover portion 34 are sewn to the vehicle body side wall 12 (i.e., to the outer panel 21A). Thereafter, an inlet opening 13 and mounting holes 14 are punched out.

In the meantime, a joint portion 44 of a driver side tether components 43 is joined to the central region 16 on an inner surface of the driver side wall 15.

Thereafter, the vehicle body side wall 12 and driver side wall 15 are laid one on the other with the outer surfaces facing each other and sewn together by the outer circumferential edges and the airbag is then reversed inside out via the inlet opening 13. Subsequently, arms 45 (45L and 45R), 46 (46L and 46R), 50 (50L and 50R) and connecting sections 40 and 41 are taken out of the inlet opening 13, and then the arms 45 (45L and 45R) and connecting sections 40 and 41, and the arms 46 (46L and 46R) and 50 (50L and 50R) are joined together, respectively. If then stitches 52 are put back inside the airbag 10E via the inlet opening 13, the airbag 10E is completed.

With the airbag 10E, the same operation and effects as the second embodiment will be obtained. Further, the all-in-one structure of the internal member 70 including the belt member 32, the reinforcing cloth 54 and the vehicle body side tether component 48 will facilitate parts control.

Figure 21:
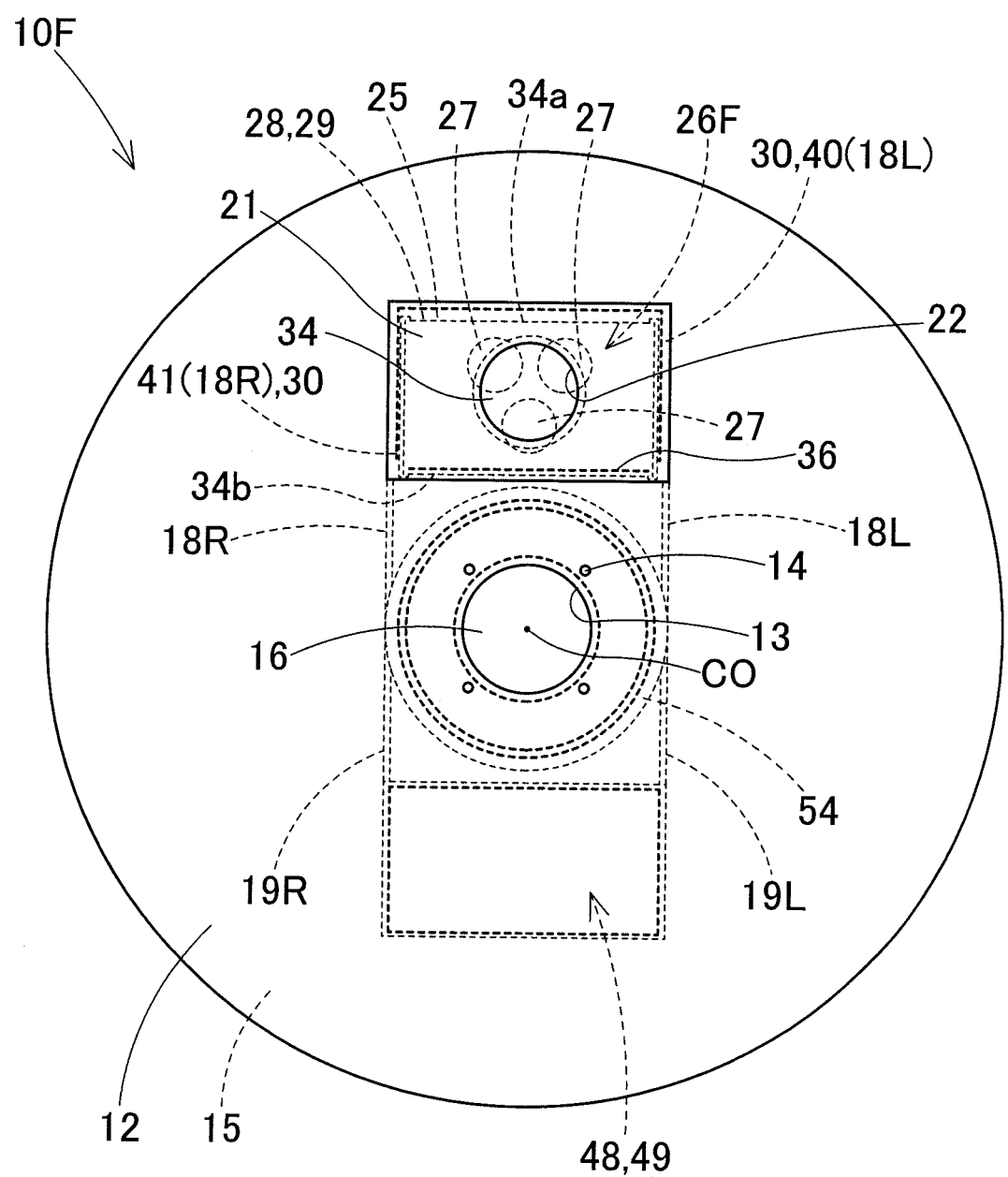
FIG. 21 is a bottom view of yet another modification of the airbag of the first embodiment.
Figure 22:
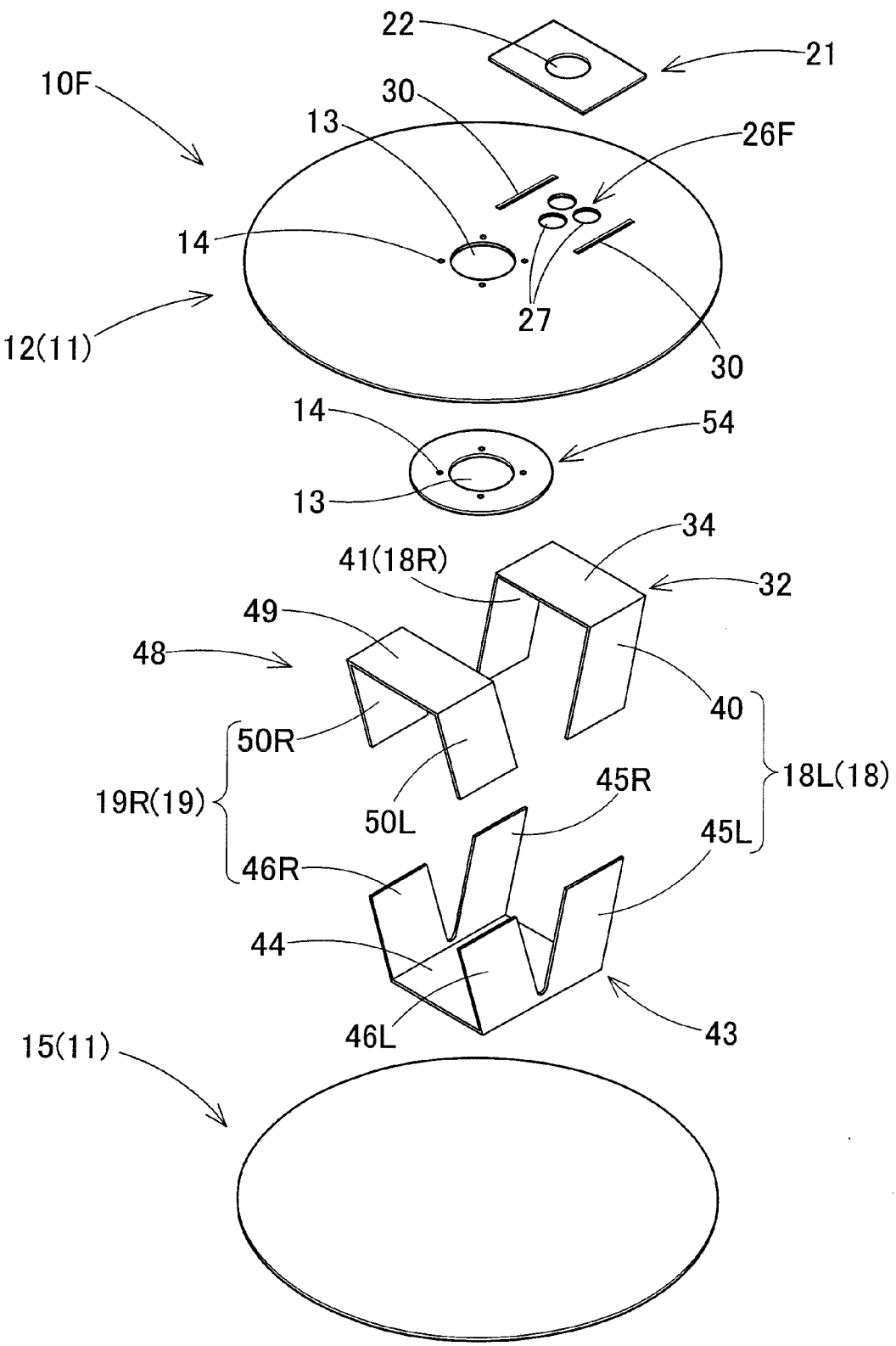
FIG. 22 schematically depicts components of the airbag of FIG. 21 by perspective views.

Although the inner panel 25/25A of the foregoing embodiments has only one inner opening 26, the inner opening may be composed of more than one through holes 27, as an inner opening 26F of an airbag 10F shown in FIGS. 21 and 22. Although the inner opening 26F of the illustrated embodiment is composed of three through holes 27, the number of the through holes 27 may be two, or four or more.

This configuration will help adjust the flow rate and speed of an inflation gas G exhausted from the vent hole 22 by changing number and/or opening area of the through holes 27 of the inner opening 26F, without changing the contour of the vent hole 22, thereby giving more flexibility to pressure control of the airbag 10F at cushioning the driver.

By way of example, if the inner opening 26F has a same opening area as the inner opening 26 but is composed of a plurality of through holes 27, the inner opening 26F will cause a flow resistance and suppress the flow amount of an inflation gas G at opening of the vent hole 22.

What is claimed is:

1. An airbag apparatus for a driver's seat adapted to be mounted on a boss section located in a vicinity of a generally center of a ring section of a steering wheel for holding by a driver, the airbag apparatus having an airbag that is adapted to be housed in the boss section in a folded-up configuration and is so inflatable as to separate a driver side wall which is deployable toward the driver and a vehicle body side wall which is deployable toward the ring section and includes at a generally center of the vehicle body side wall an inlet opening for introducing an inflation gas, the airbag comprising:

a vent hole that is formed in a circumference of the inlet opening on the vehicle body side wall for exhausting an inflation gas; and
   a vent mechanism for opening the vent hole, comprising:
   a belt member including:
      a cover portion that covers the vent hole in an openable fashion; and
      two connecting sections that extend from opposite sides of the cover portion in a continuous fashion and are connected to the driver side wall by a joint that is located toward a central region of the driver side wall relative to the vent hole as viewed from a side of the driver side wall at full inflation of the airbag, thus the connecting sections functioning as first tethers that connect the vehicle body side wall and the driver side wall for controlling a clearance between a vicinity of the vent hole on the vehicle body side wall and the joint to the driver side wall at airbag inflation;

an outer panel that is composed of a part of the vehicle body side wall, the outer panel is located on an outer side of the cover portion and provided with the vent hole;
   an inner panel that is located on an inner side of the cover portion and provided with an inner opening which allows an internal pressure of the airbag to act on the cover portion therethrough; and
   a guide section which the two connecting sections run through in a movable fashion toward the vent hole in order to allow the cover portion to loosen and open the vent hole for releasing an inflation gas when the driver side wall cushions the driver and moves toward the vehicle body side wall, the guide section holding the two connecting sections such that the connecting sections function as the first tethers at airbag inflation, wherein:
   the vent hole is so designed as to be located in front of the inlet opening and at a space between the boss section and the ring section of the steering wheel at airbag deployment; and
   the connecting sections are located at left and right sides of the cover portion and an outer edge deployable at a front side in a width direction and in a front and rear direction of the cover portion is connected neither to the outer panel that is composed of the part of the vehicle body side wall nor to the inner panel, whereas an inner edge located at a rear side in a width direction of the cover portion is connected at least to the inner panel.

2. The airbag apparatus of claim 1 wherein the two connecting sections are arranged symmetrically about a straight line that connects the inlet opening and the vent hole as viewed from the side of the driver side wall at full inflation of the airbag.

3. The airbag apparatus of claim 2 further comprising two second tethers that are connected to the vehicle body side wall and driver side wall in a symmetric fashion to the first tethers about the inlet opening as viewed from the side of the driver side wall at full inflation of the airbag.

4. The airbag apparatus of claim 1, wherein:
   the inner panel of the vent mechanism is connected to an inner surface of the vehicle body side wall by opposite edges of the inner panel in a width direction of the cover portion;
   the guide section is composed of a tubular region formed of the inner panel and the outer panel, which is composed of the part of the vehicle body side wall, between joints of the opposite edges of the inner panel to the vehicle body side wall; and
   the cover portion of the belt member is located between the outer panel, which is composed of the part of the vehicle body side wall, and the inner panel such that the two connecting sections protrude out of opposite ends of the tubular region.

5. The airbag apparatus of claim 1 wherein the inner opening of the inner panel is composed of a plurality of through holes.

* * * * *